US012615677B2

(12) United States Patent (10) Patent No.: US 12,615,677 B2
Ouchi (45) Date of Patent: Apr. 28, 2026

(54) COMMUNICATION APPARATUS, COMMUNICATION CONTROL METHOD, COMMUNICATION METHOD, AND COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 504 days.

(21) Appl. No.: 17/981,532

(22) Filed: Nov. 7, 2022

(65) Prior Publication Data

US 2023/0057296 A1 Feb. 23, 2023

Related U.S. Application Data

(63) Continuation of application No. PCT/JP2021/017692, filed on May 10, 2021.

(30) Foreign Application Priority Data

May 25, 2020 (JP) ................................. 2020-090828

(51) Int. Cl.
*H04W 76/15* (2018.01)
*H04W 28/02* (2009.01)
(Continued)

(52) U.S. Cl.
CPC ....... *H04W 76/15* (2018.02); *H04W 28/0215* (2013.01); *H04W 72/0446* (2013.01); *H04W 72/23* (2023.01)

(58) Field of Classification Search
CPC ............. H04W 76/15; H04W 28/0215; H04W 72/0446; H04W 72/23; H04W 84/12
See application file for complete search history.

(56) References Cited

U.S. PATENT DOCUMENTS 11,304,135 B2 4/2022 Ouchi
2012/0182883 A1* 7/2012 Junell ................... H04W 16/14
370/329
(Continued)

FOREIGN PATENT DOCUMENTS

JP 2018-050133 A 3/2018
WO 2019/142524 A1 7/2019
(Continued)

OTHER PUBLICATIONS

International Search Report issued by the Japan Patent Office on Jul. 6, 2021 in corresponding International Application No. PCT/JP2021/017692, with English translation.
(Continued)

*Primary Examiner* — Dady Chery
(74) *Attorney, Agent, or Firm* — Carter, DeLuca & Farrell LLP

(57) ABSTRACT

A communication apparatus capable of performing wireless communication with another apparatus by simultaneously using a first link and a second link performs, based on reception, from a first other apparatus, of a predetermined frame for executing communication by simultaneously using the first link and the second link, transmission, to the first other apparatus, of information indicating allocation of radio resources in the first link and the second link to the first other apparatus, and transmission, to a second other apparatus different from the first other apparatus, of information indicating allocation of the radio resources in one of the first link and the second link to the second other apparatus.

19 Claims, 16 Drawing Sheets

(51) Int. Cl.
    *H04W 72/0446*     (2023.01)
    *H04W 72/23*     (2023.01)

(56)         References Cited

U.S. PATENT DOCUMENTS

| | | | |
|---|---|---|---|
| 2013/0012217 A1* | 1/2013 | Suda | H04W 72/0446 |
| | | | 455/450 |
| 2013/0201469 A1* | 8/2013 | Treado | G01N 33/1826 |
| | | | 356/301 |
| 2016/0255627 A1* | 9/2016 | Malik | H04W 72/0446 |
| | | | 370/329 |
| 2017/0273129 A1 | 9/2017 | Ouchi | |
| 2020/0053773 A1 | 2/2020 | Seok | |
| 2020/0059942 A1* | 2/2020 | Itoh | H04W 28/12 |
| 2021/0058219 A1* | 2/2021 | Kimura | H04L 5/14 |
| 2021/0392502 A1 | 12/2021 | Ouchi | |
| 2021/0392682 A1 | 12/2021 | Ouchi | |
| 2022/0216947 A1* | 7/2022 | Kim | H04L 1/1819 |
| 2022/0272631 A1 | 8/2022 | Ouchi | |

FOREIGN PATENT DOCUMENTS

| | | |
|---|---|---|
| WO | 2020/008049 A1 | 1/2020 |
| WO | 2020/040589 A1 | 2/2020 |

OTHER PUBLICATIONS

Naribole, S. et al., "Multi-link Channel Access Discussion Follow-up" IEEE 802.11-19/1836r4 (Nov. 2019) pp. 1-21.

Khorov, E. et al., "Current Status and Directions of IEEE 802.11be, the Future WiFi 7" IEEE Access (May 2020) pp. 88664-88688, vol. 8.

Chinese Office Action issued by the China National Intellectual Property Administration on Jun. 14, 2025 in corresponding CN Patent Application No. 202180037237.5, with English translation.

\* cited by examiner

F I G. 1
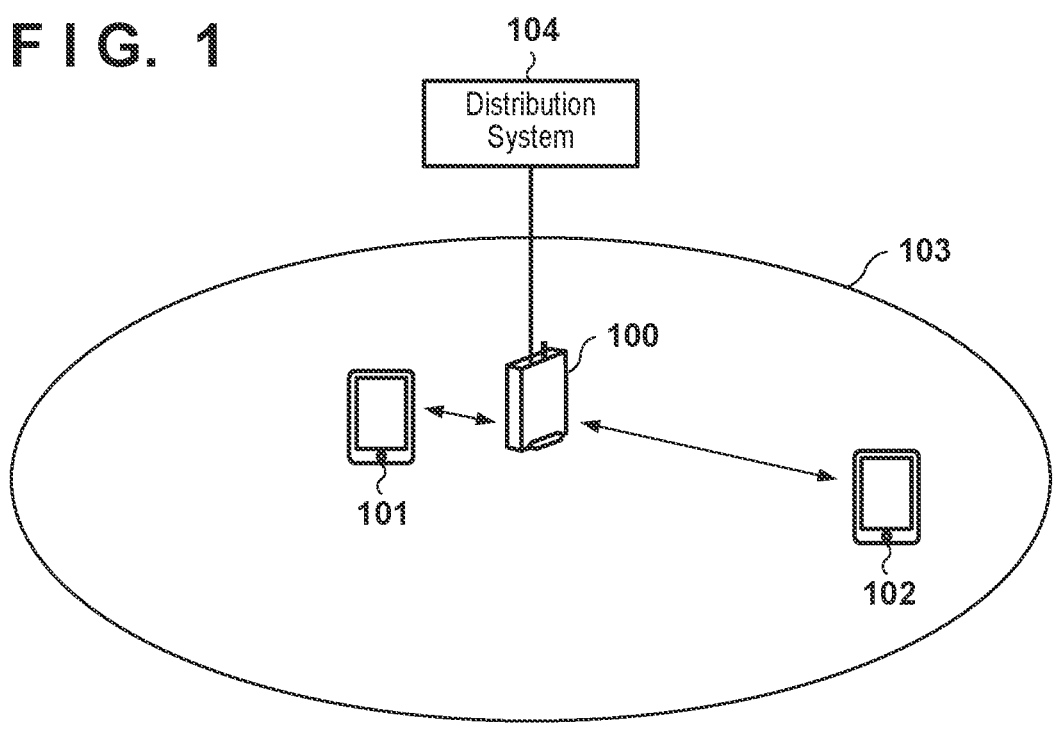
F I G. 2
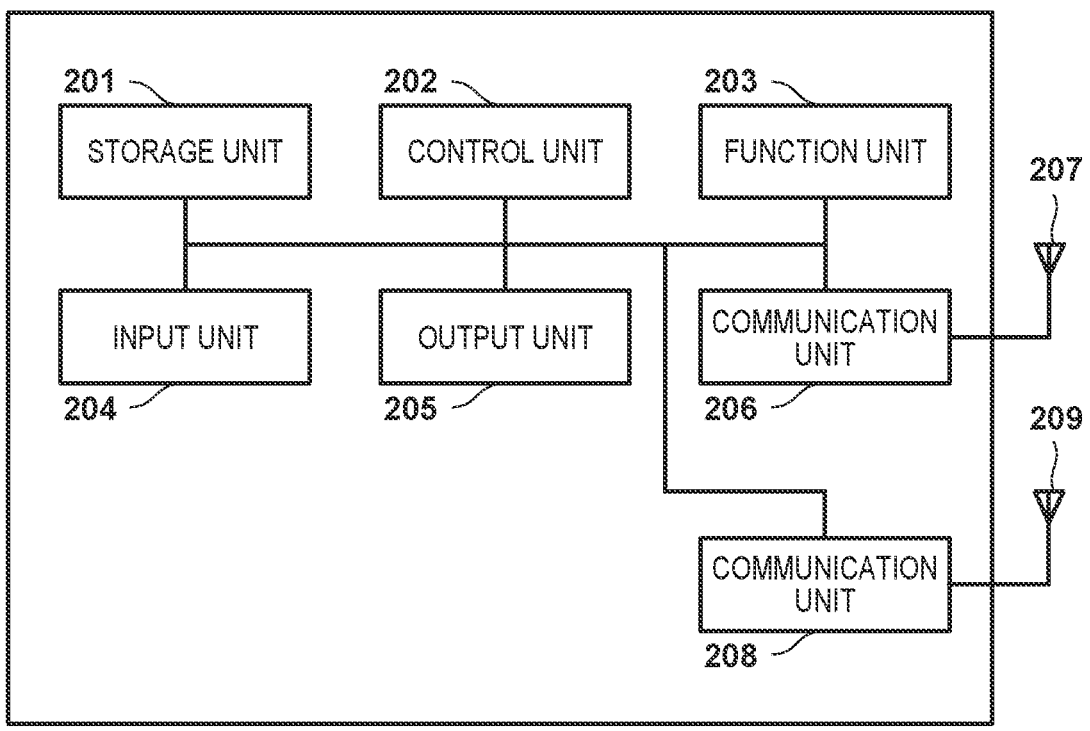

F I G. 3
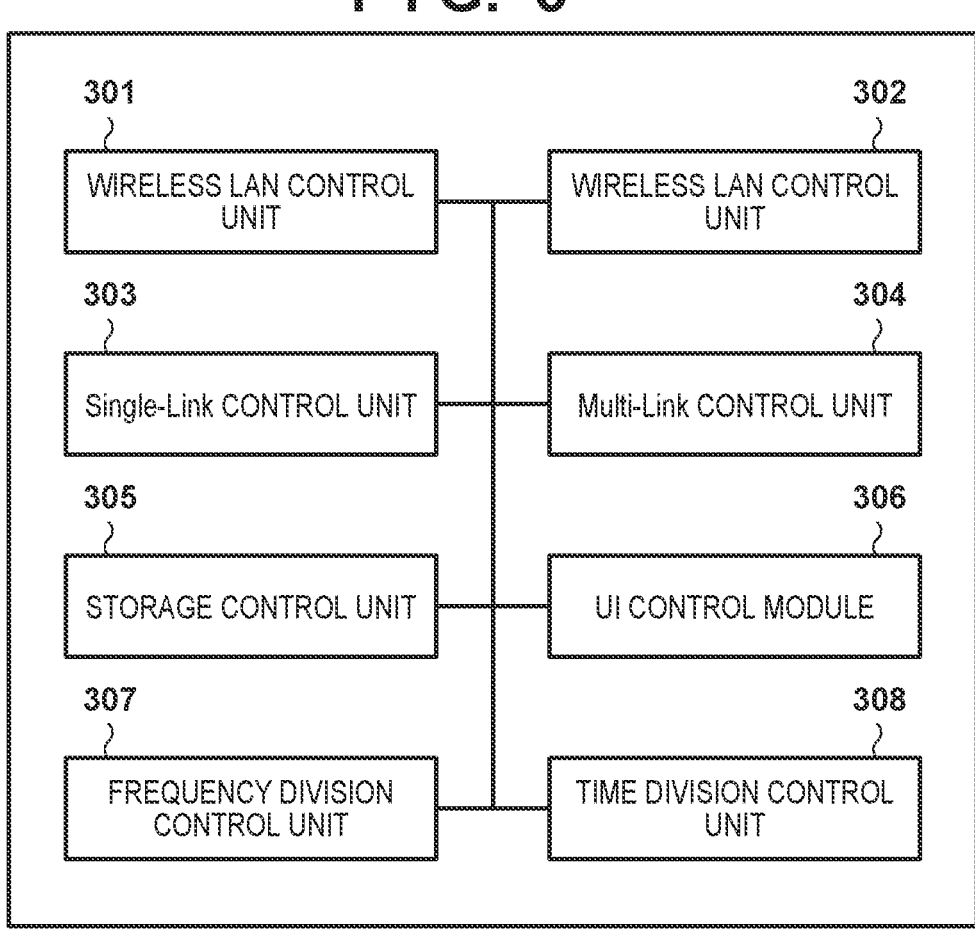

F I G. 4
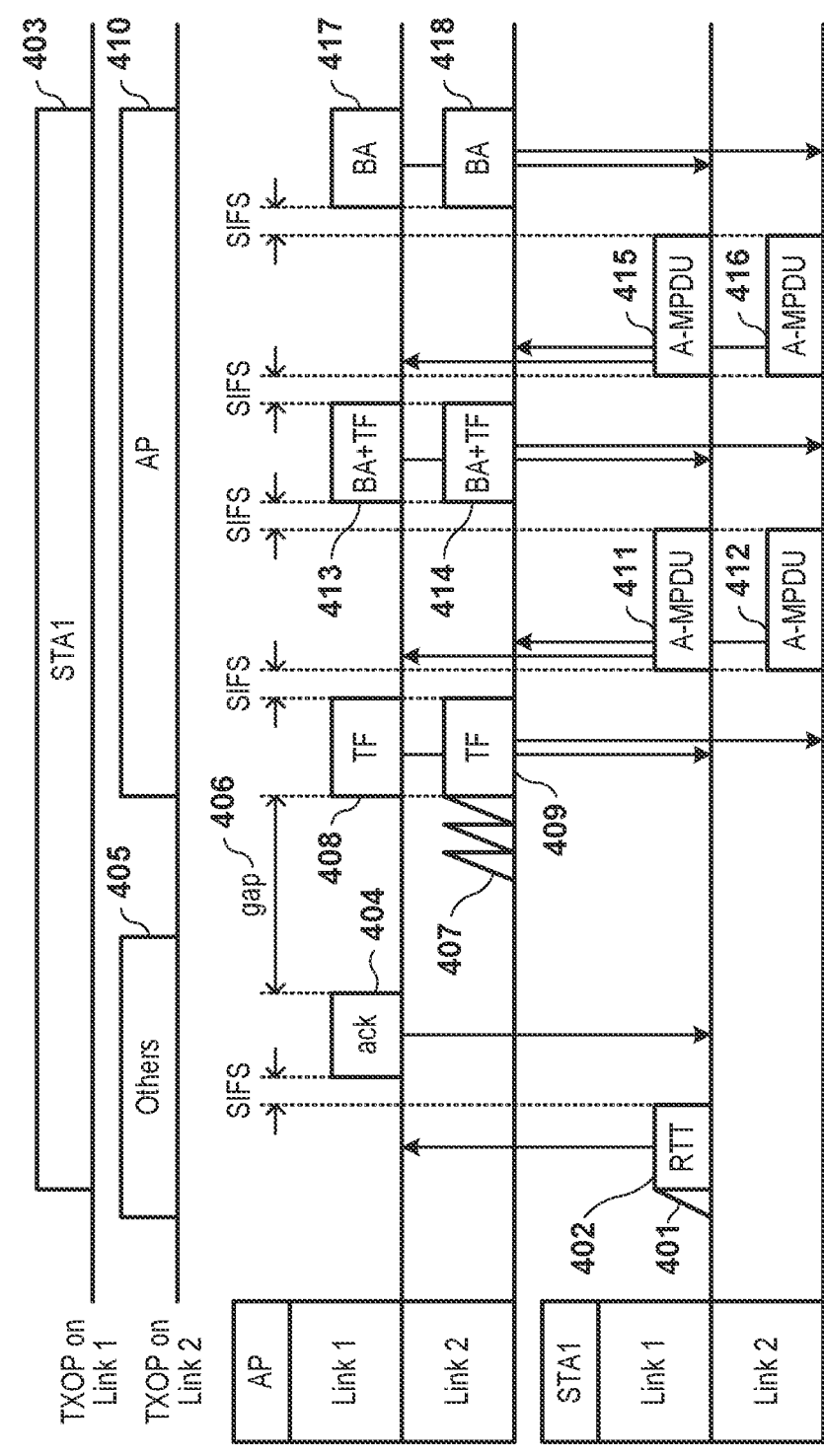

F I G. 5

F I G. 6
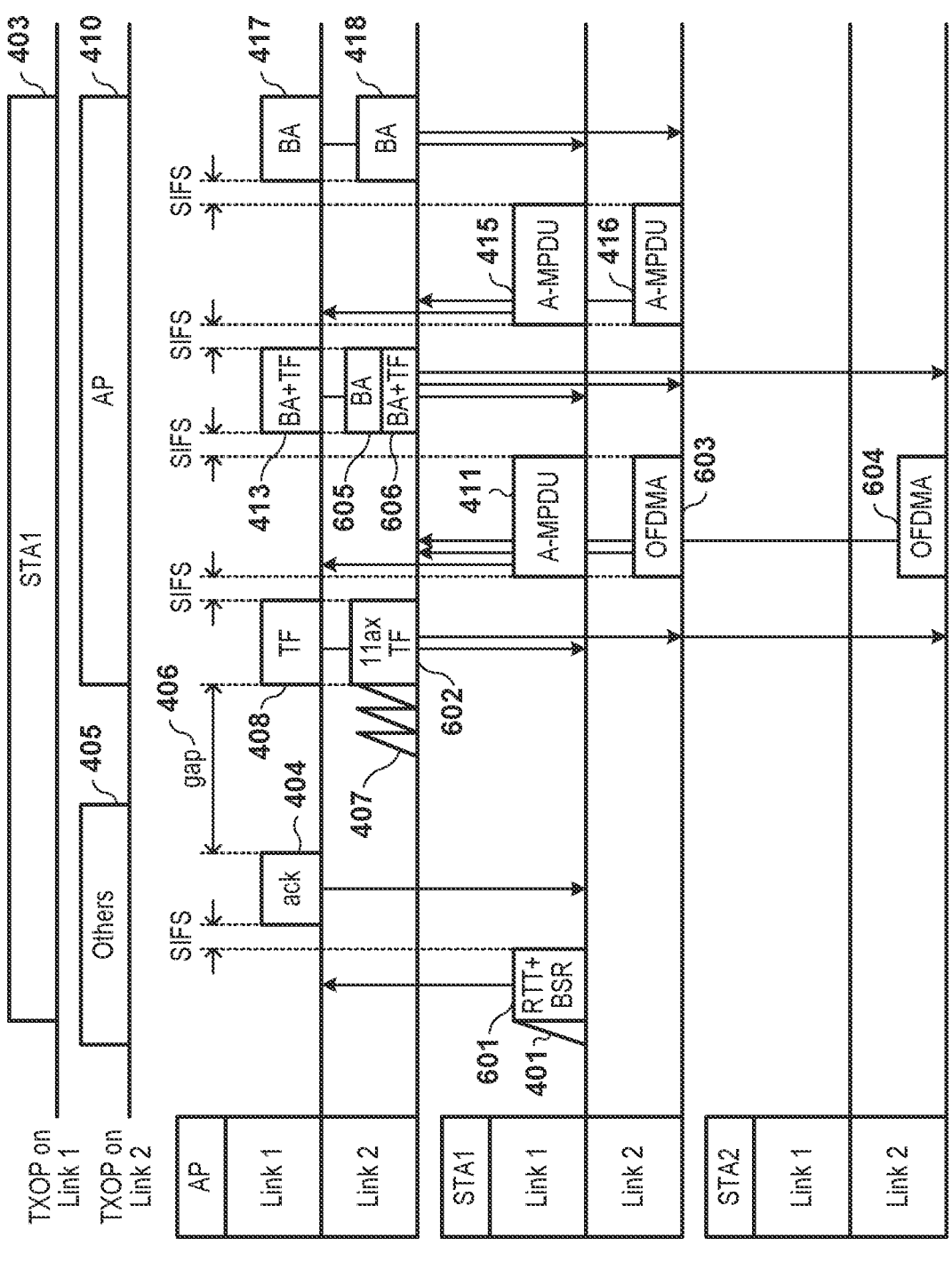

F I G. 7
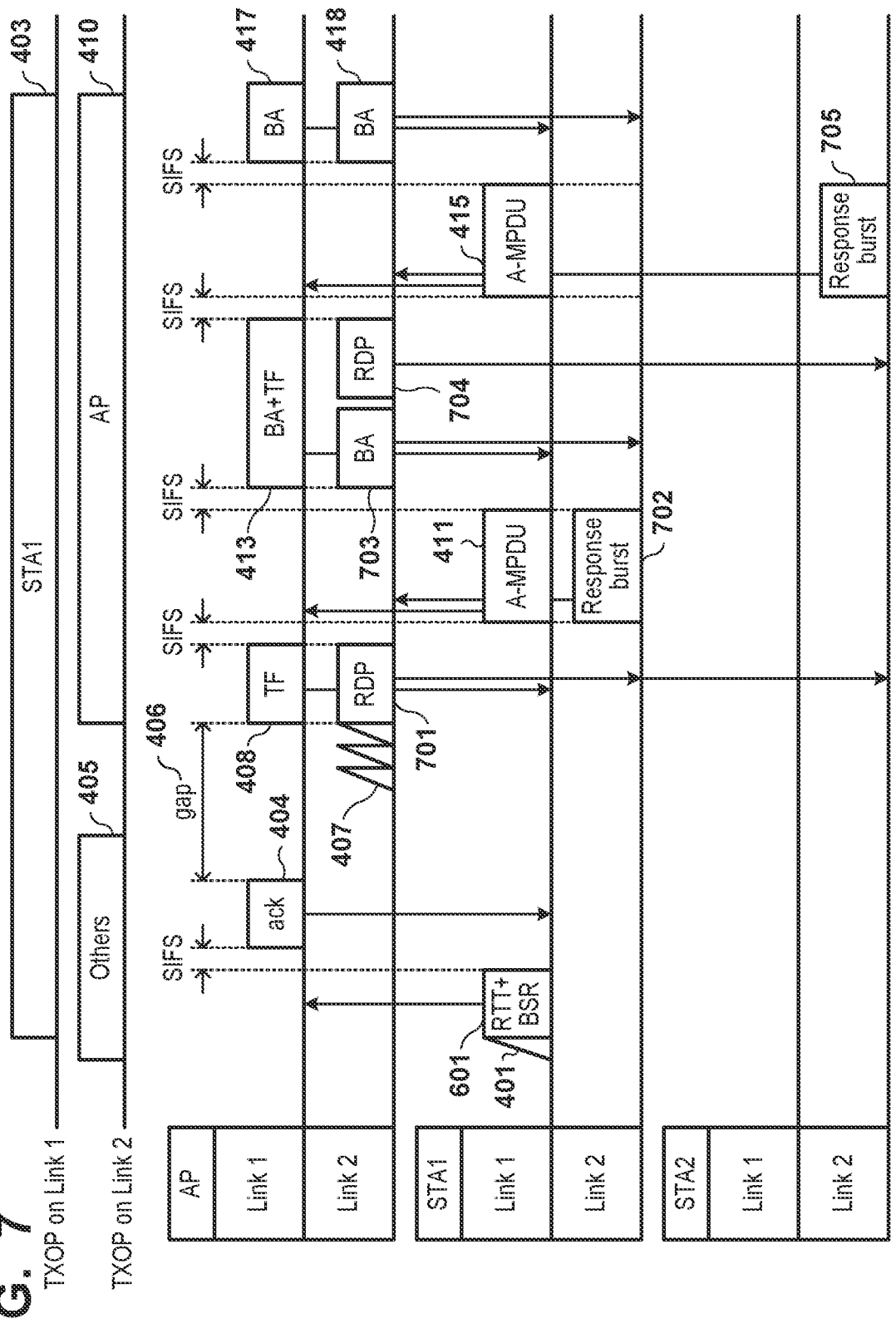

F I G. 8B
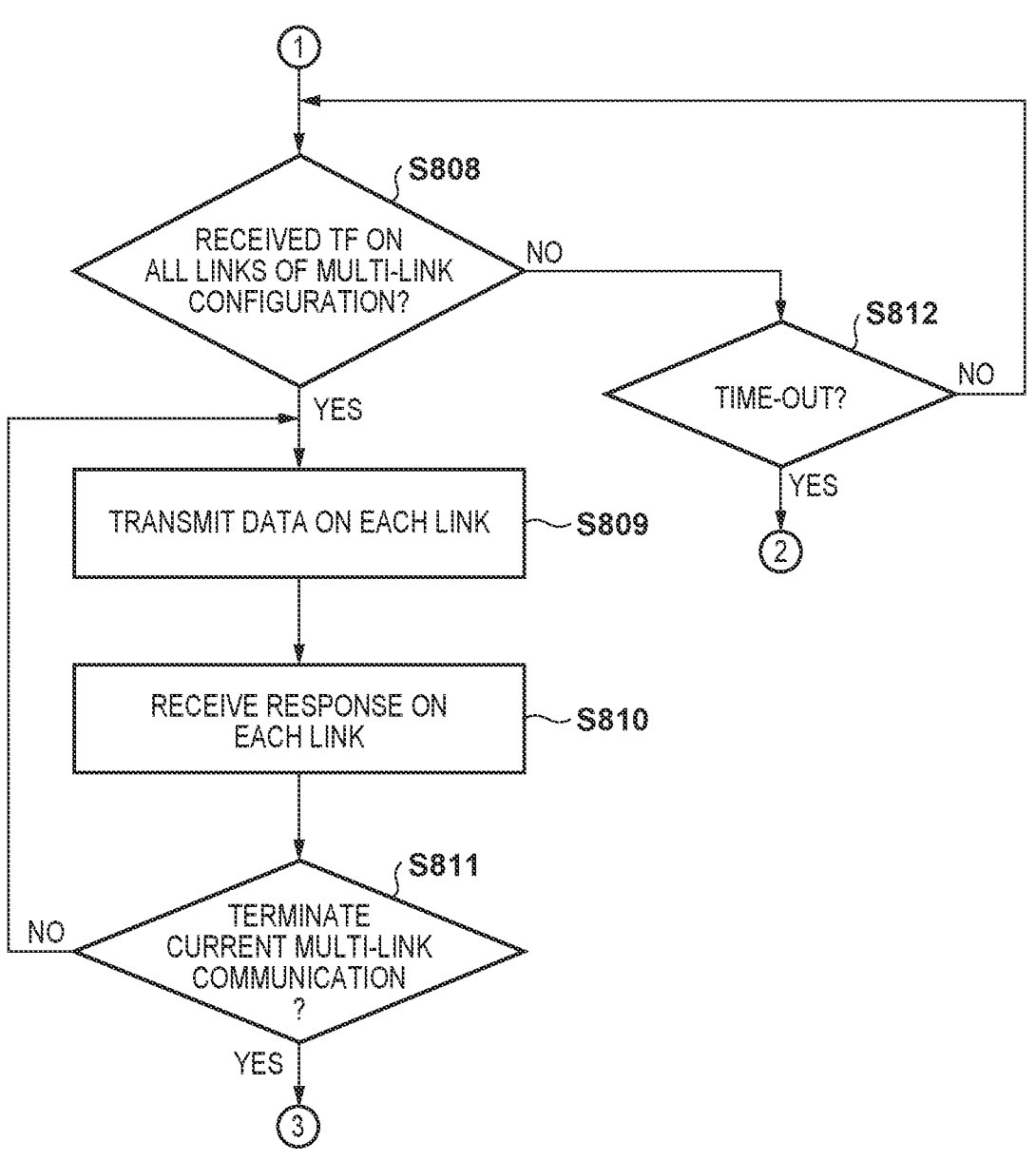

F I G. 9A
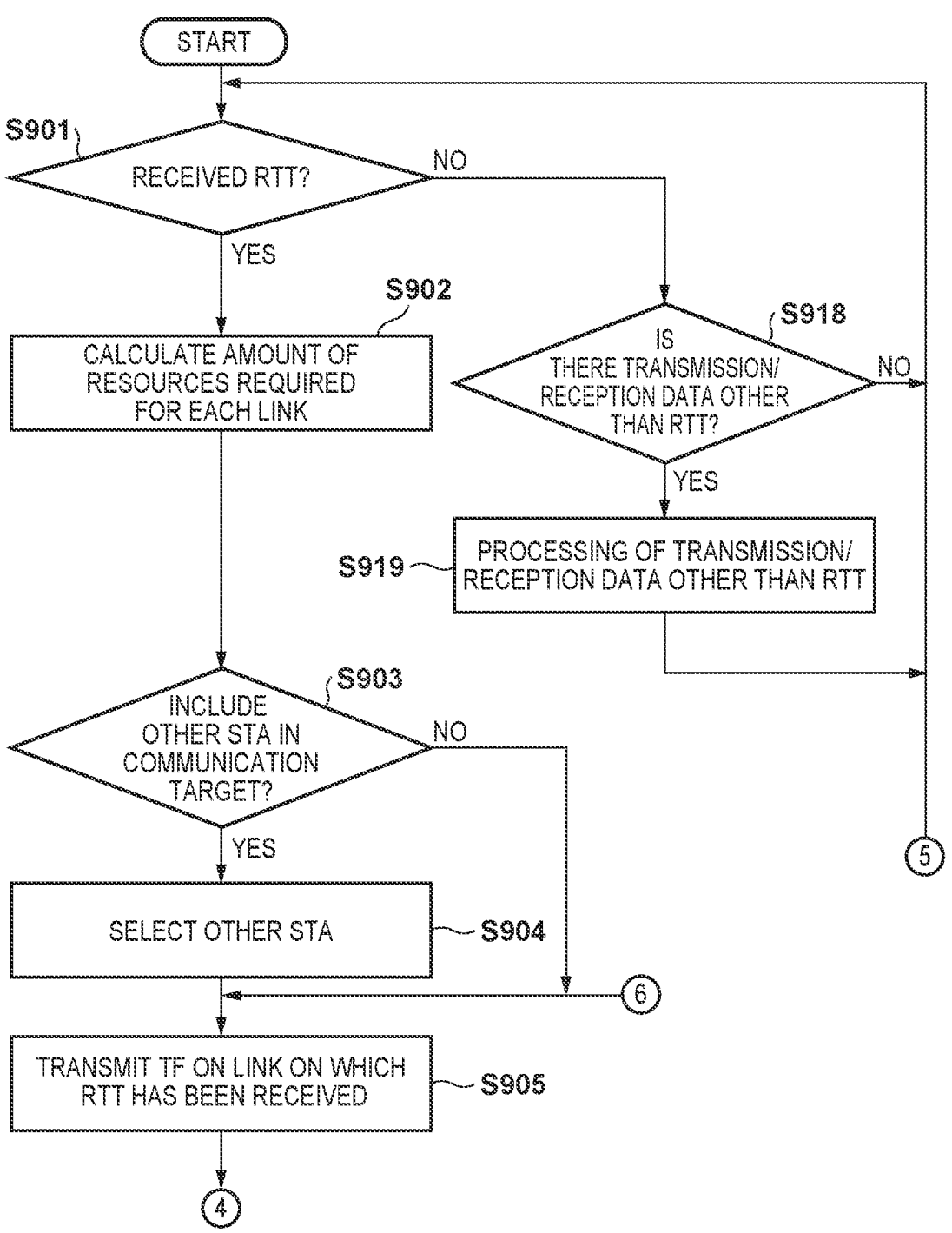

F I G. 9B
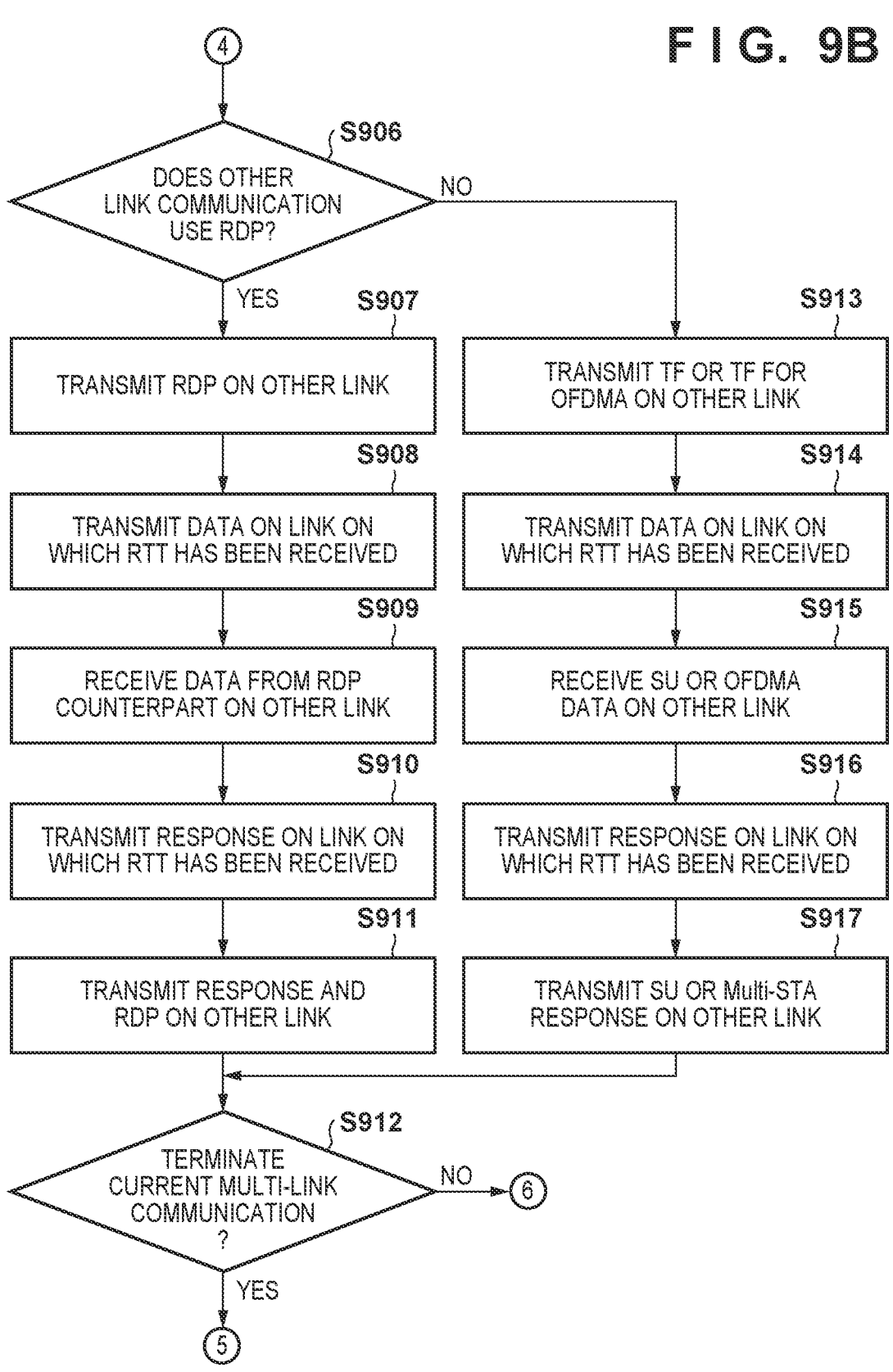

F I G. 10A

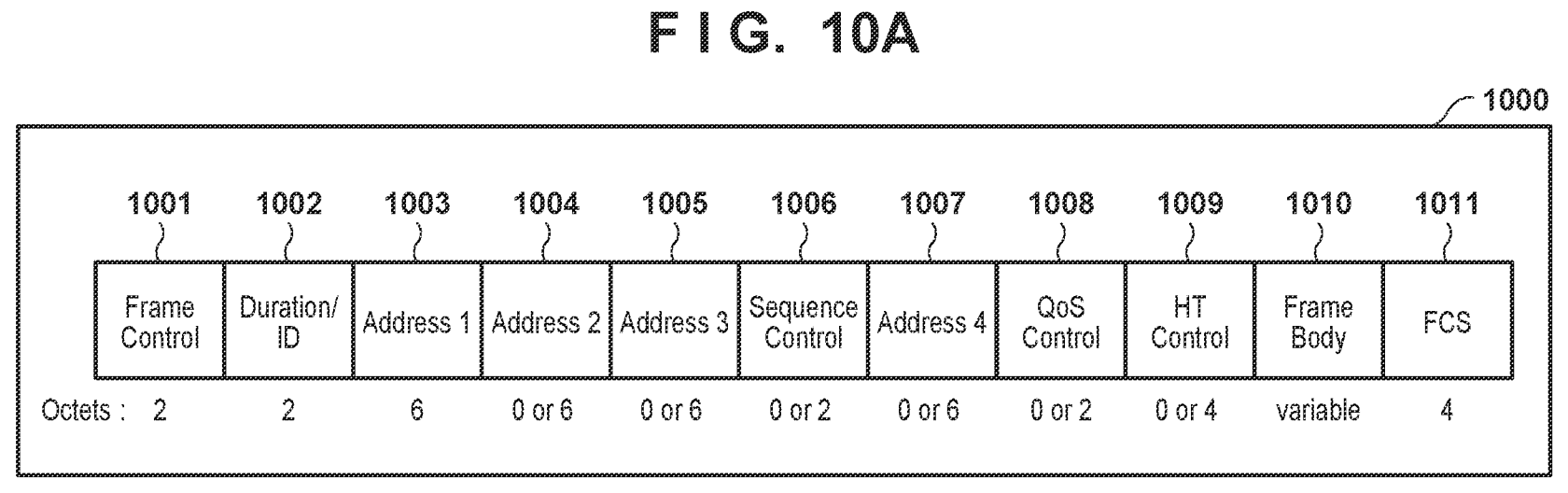

| 1001 | 1002 | 1003 | 1004 | 1005 | 1006 | 1007 | 1008 | 1009 | 1010 | 1011 |
|---|---|---|---|---|---|---|---|---|---|---|
| Frame Control | Duration/ ID | Address 1 | Address 2 | Address 3 | Sequence Control | Address 4 | QoS Control | HT Control | Frame Body | FCS |
| Octets : 2 | 2 | 6 | 0 or 6 | 0 or 6 | 0 or 2 | 0 or 6 | 0 or 2 | 0 or 4 | variable | 4 |

1000

F I G. 10B

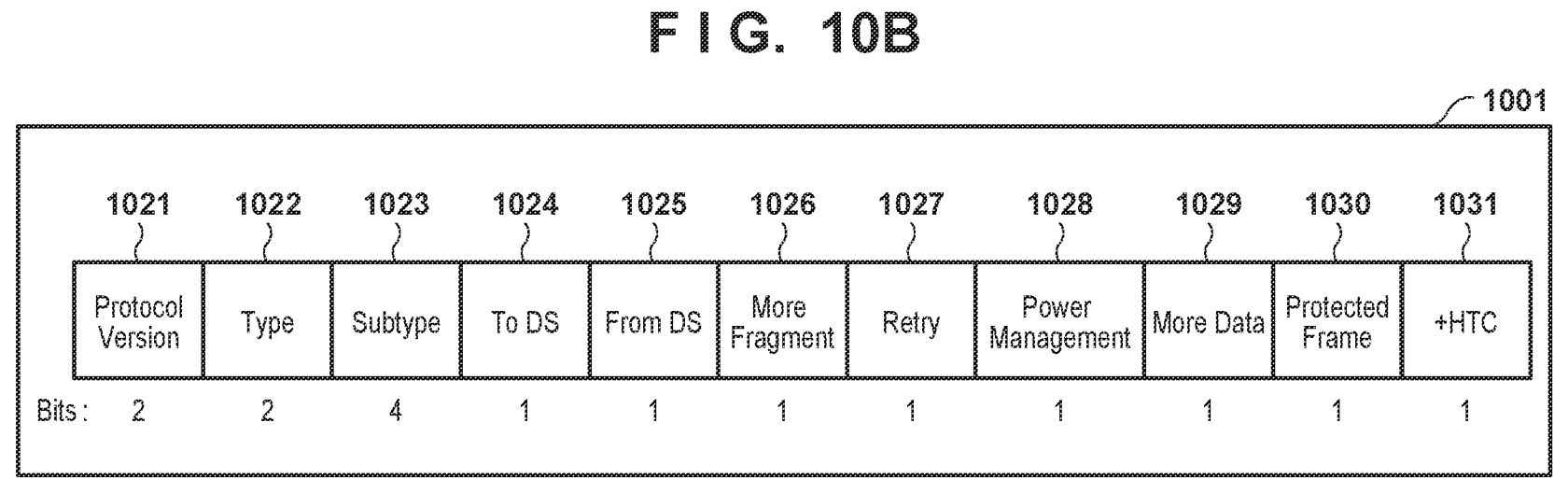

1001

| 1021 | 1022 | 1023 | 1024 | 1025 | 1026 | 1027 | 1028 | 1029 | 1030 | 1031 |
|---|---|---|---|---|---|---|---|---|---|---|
| Protocol Version | Type | Subtype | To DS | From DS | More Fragment | Retry | Power Management | More Data | Protected Frame | +HTC |
| Bits: 2 | 2 | 4 | 1 | 1 | 1 | 1 | 1 | 1 | 1 | 1 |

FIG. 10C

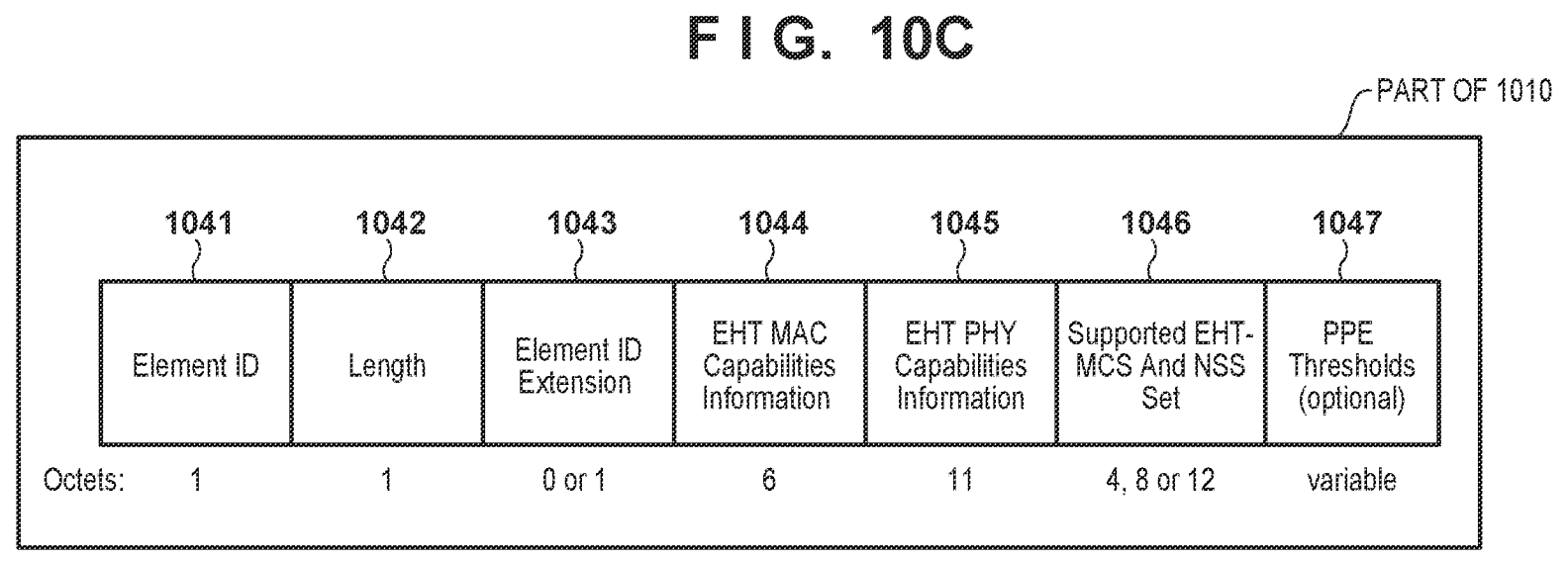

PART OF 1010

| | 1041 | 1042 | 1043 | 1044 | 1045 | 1046 | 1047 |
|---|---|---|---|---|---|---|---|
| | Element ID | Length | Element ID Extension | EHT MAC Capabilities Information | EHT PHY Capabilities Information | Supported EHT-MCS And NSS Set | PPE Thresholds (optional) |
| Octets: | 1 | 1 | 0 or 1 | 6 | 11 | 4, 8 or 12 | variable |

F I G. 11

| Variant | B0 | B1 | B2-B29 | B30 | B31 |
|---------|----|----|--------|-----|-----|
| HT | 0 | 0 | HT Control Middle | AC Constraint | RDG/More PPDU |
| VHT | 1 | 0 | VHT Control Middle | AC Constraint | RDG/More PPDU |
| EH/EHT | 1 | 1 | A-Control | | |

A-Control subfield format

| | Control List | Padding |
|--|-------------|---------|
| Bits: | variable | 0 or more |

Control subfield format

| Control ID | Control Information |
|-----------|---------------------|
| Bits: | 4 | variable |

Control ID subfield values

| Control ID value | Meaning | Length | Content of the Control Information subfield |
|-----------------|---------|--------|---------------------------------------------|
| 0 | Triggered response scheduling (TRS) | 26 | SAME INFORMATION AS TF |
| 1 | Operating mode (OM) | 12 | bits5:: UL MU Disable |
| 2 | HE Link adaptation (HLA) | 26 | |
| 3 | Buffer status report (BSR) | 26 | BUFFER AMOUNT OF EACH ACCESS CATEGORY OF STA |
| 4 | UL power headroom (UPH) | 8 | RELATED TO MARGIN VALUE OF COMMUNICATION POWER LEVEL |
| 5 | Bandwidth query report (BQR) | 10(16) | Available Channel Bitmap OF 20MHz UNITS |
| 6 | Command and status (CAS) | 8 | |
| 7-14 | Reserved | | |
| 15 | Ones need expansion surely (ONES) | 26 | |

F I G. 12A

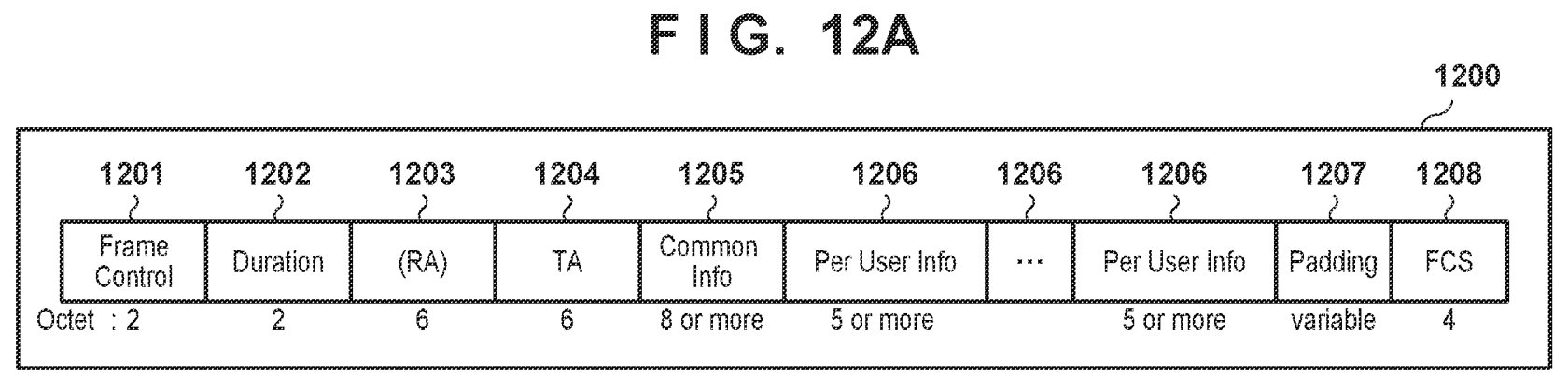

| 1201 | 1202 | 1203 | 1204 | 1205 | 1206 | 1206 | 1206 | 1207 | 1208 |
|---|---|---|---|---|---|---|---|---|---|
| Frame Control | Duration | (RA) | TA | Common Info | Per User Info | ... | Per User Info | Padding | FCS |
| Octet : 2 | 2 | 6 | 6 | 8 or more | 5 or more | | 5 or more | variable | 4 |

1200

F I G. 12B
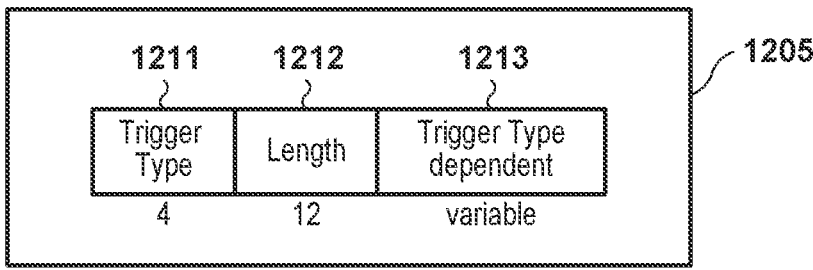
F I G. 12C
| Trigger Type subfield value | Description |
|---|---|
| 0 | Basic Trigger |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll(NFRP) |
| 8 | Multi-Link Trigger |
| 9-15 | Reserved |
1211

COMMUNICATION APPARATUS, COMMUNICATION CONTROL METHOD, COMMUNICATION METHOD, AND COMPUTER-READABLE STORAGE MEDIUM

CROSS-REFERENCE TO RELATED APPLICATIONS

This application is a Continuation of International Patent Application No. PCT/JP2021/017692, filed May 10, 2021, which claims the benefit of Japanese Patent Application No. 2020-090828 filed May 25, 2020, both of which are hereby incorporated by reference herein in their entirety.

BACKGROUND OF THE INVENTION

Field of the Invention

The present invention relates to a communication control technique using a plurality of radio links.

Background Art

As a communication standard concerning a wireless LAN (Wireless Local Area Network), an IEEE (Institute of Electrical and Electronics Engineers) 802.11 standard is known. The IEEE802.11ax standard as the latest standard of the IEEE802.11 standard series implements improvement of a communication speed under a congested situation using OFDMA (Orthogonal Frequency-Division Multiple Access), in addition to high peak throughput (see Japanese Patent Laid-Open No. 2018-050133).

Presently, to further improve the throughput, a task group for defining the IEEE802.11be standard as a standard replacing the IEEE802.11ax standard has been formed. The task group has proposed a multi-link/multi-band mechanism in which a communication apparatus performs application communication using a plurality of radio interfaces.

The present invention provides an efficient communication control technique in a wireless communication system capable of constituting a multi-link.

SUMMARY OF THE INVENTION

A communication apparatus according to one aspect of the present invention is a communication apparatus, comprising a communication unit capable of performing wireless communication; and a control unit configured to control, based on reception, from a first other apparatus, of a frame for requesting communication by simultaneously using a first link and a second link, the communication unit to transmit, to a first other apparatus, information indicating allocation of radio resources in the first link and the second link to the first other apparatus, and also transmit, to a second other apparatus different from the first other apparatus, information indicating allocation of the radio resources in one of the first link and the second link to the second other apparatus.

A communication apparatus according to another aspect of the present invention is a communication apparatus, comprising: a communication unit capable of performing wireless communication; and a control unit configured to control the communication unit to: transmit, to a first other apparatus, a predetermined frame for executing communication by simultaneously using a first link and a second link, receive, from the first other apparatus, information indicating, based on the predetermined frame, allocation of radio resources in the first link and the second link to the communication apparatus and allocation of the radio resources in one of the first link and the second link to a second other apparatus different from the communication apparatus, and transmit data to the first other apparatus using the radio resources allocated to the communication apparatus in each of the first link and the second link.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a view showing an example of the configuration of a system.

FIG. 2 is a block diagram showing an example of the hardware arrangement of an AP and an STA.

FIG. 3 is a block diagram showing an example of the functional arrangement of the AP.

FIG. 4 is a timing chart showing the first example of the flow of communication.

FIG. 5 is a timing chart showing the second example of the flow of communication.

FIG. 6 is a timing chart showing the third example of the flow of communication.

FIG. 7 is a timing chart showing the fourth example of the flow of communication.

FIG. 8B is a flowchart illustrating the example of the procedure of the processing executed by the STA.

FIG. 9A is a flowchart illustrating an example of the procedure of processing executed by the AP.

FIG. 9B is a flowchart illustrating the example of the procedure of the processing executed by the AP.

FIG. 10A is a view for explaining the structure of a MAC frame format.

FIG. 10B is a view for explaining the structure of the MAC frame format.

FIG. 10C is a view for explaining the structure of the MAC frame format.

FIG. 11 is a view for explaining the structure of an HT Control field format.

FIG. 12A is a view for explaining the structure of a trigger frame.

FIG. 12B is a view for explaining the structure of the trigger frame.

FIG. 12C is a table for explaining the structure of the trigger frame.

DESCRIPTION OF THE EMBODIMENTS

Figure 8A:
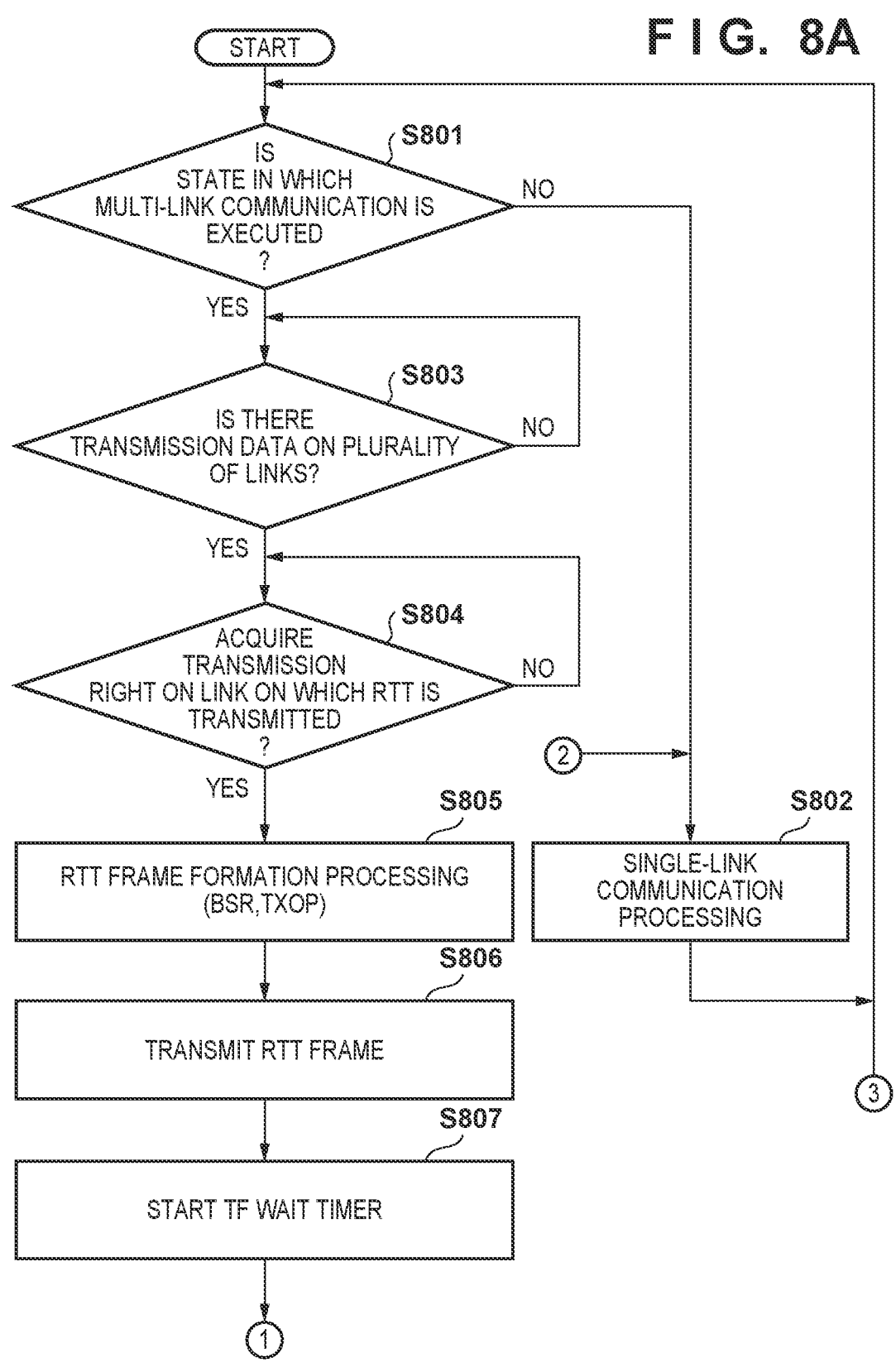
FIG. 8A is a flowchart illustrating an example of the procedure of processing executed by the STA.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(System Configuration)

FIG. 1 shows an example of the configuration of a wireless communication system according to this embodiment. The wireless communication system includes, for example, a wireless LAN access point (AP 100) and stations (STAs 101 and 102) complying with the IEEE802.11 standard series. The AP 100 forms and manages a network (BSS 103). Note that BSS is an acronym for Basic Service Set. Each of the STAs 101 and 102 can join the BSS 103 formed by the AP 100, and communicate with the AP 100. The STAs 101 and 102 will sometimes be referred to as STA 1 and STA 2, respectively, hereinafter, and the AP 100 will sometimes simply be referred to as the AP hereinafter. Note that the in this case, the STA 101 may be either STA 1 or STA 2, and the STA 102 may also be either STA 1 or STA 2.

In this embodiment, the AP 100 has a multi-link function. The multi-link function is a function of making it possible to simultaneously use a plurality of radio links by synchronizing a plurality of radio interfaces with each other or making them cooperate with each other. By simultaneously using the plurality of radio links, high speed or stabilization of communication can be achieved, as compared with a case in which one radio link is individually used. By simultaneously using the plurality of radio links, it is possible to obtain, for example, at least one of a satisfactory signal to noise ratio, low interference, low delay, and low jitter, thereby stabilizing communication.

This wireless communication system further includes a distribution system (DS 104). The AP 100 can be connected to another BSS or an external network via the DS 104. The AP 100 can establish connection to another BSS or an external network via, for example, a wired line such as Ethernet® or a telephone line. Alternatively, the AP 100 may establish this connection via a wireless line such as LTE (Long-Term Evolution) or WiMAX (Worldwide Interoperability for Microwave Access). The AP 100 may establish this connection via a wireless LAN complying with the IEEE802.11 standard series. Note that in this case, a radio channel used in connection between the AP 100 and another BSS or an external network may be the same as or different from a radio channel used in connection between the AP 100 and the STAs 101 and 102.

(Arrangement of Apparatus)

FIG. 2 shows an example of the hardware arrangement of each of the communication apparatuses (AP and STAs). The communication apparatus includes, as an example of its hardware arrangement, a storage unit 201, a control unit 202, a function unit 203, an input unit 204, an output unit 205, a first communication unit 206, a first antenna 207, a second communication unit 208, and a second antenna 209.

The storage unit 201 is formed by one or more memories including both or one of a ROM and a RAM, and stores programs for performing various kinds of operations to be described later and various kinds of information such as communication parameters for wireless communication. Note that ROM is an acronym for Read Only Memory, and RAM is an acronym for Random Access Memory. Other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 201. The storage unit 201 may include storage devices such as a plurality of memories.

The control unit 202 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym for Central Processing Unit, and MPU is an acronym for Micro Processing Unit. The control unit 202 executes the programs stored in the storage unit 201, thereby controlling the entire apparatus. Note that the control unit 202 may control the entire apparatus by cooperation of the programs stored in the storage unit 201 and an OS (Operating System).

In addition, the control unit 202 controls the function unit 203 to execute predetermined processing such as image capturing, printing, or projection. The function unit 203 is hardware used by the apparatus to execute predetermined processing. For example, if the apparatus is a camera, the function unit 203 is an image capturing unit and performs image capturing processing. For example, if the apparatus is a printer, the function unit 203 is a printing unit and performs print processing. For example, if the apparatus is a projector, the function unit 203 is a projection unit and performs projection processing. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

Each of the first communication unit 206 and the second communication unit 208 controls wireless communication complying with the IEEE802.11 standard series, or controls IP communication. Each of the first communication unit 206 and the second communication unit 208 is a so-called radio chip, and may itself include one or more processors and memories. In this embodiment, each of the first communication unit 206 and the second communication unit 208 can execute processing complying with at least the IEEE802.11be standard. In addition, the first communication unit 206 and the second communication unit 208 control the first antenna 207 and the second antenna 209, respectively, to transmit and receive radio signals for wireless communication. The apparatus communicates contents such as image data, document data, or video data with another communication apparatus via at least one of the first communication unit 206 and the second communication unit 208. Each of the first antenna 207 and the second antenna 209 is an antenna that can transmit and receive signals in at least any one of, for example, a sub-GHz band, 2.4-GHz band, 5-GHz band, and 6-GHz band. Note that the frequency bands (and a combination of frequency bands) to which the first antenna 207 and the second antenna 209 are adaptable are not particularly limited. Each of the first antenna 207 and the second antenna 209 may be one antenna, or may be a set of two or more antennas to perform MIMO (Multi-Input and Multi-Output) transmission/reception. Each of the first antenna 207 and the second antenna 209 may include two or more antennas (two or more sets of antennas) that are adaptable to different frequency bands.

Note that in this embodiment, under the control of the control unit 202, a multi-link operation is executed by a combination of a set of the first communication unit 206 and the first antenna 207 and a set of the second communication unit 208 and the second antenna 209. Note that FIG. 2 shows only two sets of communication units and antennas but three or more sets may be used. Alternatively, the apparatus may be configured to execute communication by establishing a plurality of radio links using only one set.

FIG. 3 shows an example of the functional arrangement of the AP. As one example, the AP includes a first wireless LAN control unit 301 and a second wireless LAN control unit 302. The AP can further include a Single-Link control unit 303, a Multi-Link control unit 304, a storage control unit 305, a UI control unit 306, a frequency division control unit 307, and a time division control unit 308. Note that these functional units may be implemented when, for example, the control unit 202 executes the programs stored in the storage unit 201, or some or all of the functional units may be implemented by dedicated hardware components.

Each of the first wireless LAN control unit 301 and the second wireless LAN control unit 302 executes various kinds of processes to transmit/receive radio signals to/from another wireless LAN apparatus (for example, another AP or STA). The AP uses these wireless LAN control units to execute wireless LAN communication control such as generation and transmission of a frame, or reception of a radio frame from another wireless LAN apparatus in accordance with the IEEE802.11 standard series. Note that the first wireless LAN control unit 301 and the second wireless LAN control unit 302 have the same basic arrangement but can include differences depending on operating frequencies (channels).

The Single-Link control unit 303 controls the first wireless LAN control unit 301 and the second wireless LAN control unit 302 to operate independently of each other. The Single-Link control unit 303 controls the first wireless LAN control unit 301 and the second wireless LAN control unit 302 to operate individually without cooperation with each other, thereby separately executing wireless communication. The Multi-Link control unit 304 controls the first wireless LAN control unit 301 and the second wireless LAN control unit 302 to operate in synchronism/cooperation with each other. The Multi-Link control unit 304 can control the first wireless LAN control unit 301 and the second wireless LAN control unit 302 to operate in cooperation with each other, thereby simultaneously communicating with a common communication partner.

The storage control unit 305 executes processing for saving the programs executed by the AP and various kinds of data. The UI control unit 306 includes hardware components concerning user interfaces (UIs) such as a touch panel and buttons configured to accept an operation on the AP by a user (not shown), and controls them. Note that the UI control unit 306 can also execute control to present information to the user, such as display of an image or the like or audio output. The frequency division control unit 307 executes control to simultaneously communicate with a plurality of terminals using one radio link by dividing a frequency bandwidth usable in the one radio link into a plurality of frequency blocks and allocating them to the plurality of terminals. The time division control unit 308 executes control to communicate with a plurality of terminals using one radio link by dividing a communicable time in the one radio link into predetermined time slots, and allocating each time slot to each terminal.

(Procedure of Processing)

The flow of communication between the AP and the STA according to this embodiment will be described using some examples. In this embodiment, the AP executes control to promote multi-link communication with the STA. This can improve communication efficiency.

Note that in the following example, each of the AP and the STA has two radio interfaces, and two radio links are formed at maximum between the AP and the STA. Note that if two radio links are formed, they will be referred to as link 1 and link 2, respectively, hereinafter. According to the multi-link function, communication is performed by simultaneously using two or more radio links formed with the communication apparatus, such as the two radio links. Note that the operating channel frequencies of the multi-link can be an arbitrary combination of the 2.4-GHz band, 5-GHz band, and 6-GHz band. For example, if the frequency interference separation capability of the terminal is high, a W52 (36, 40, 44, 48) channel in the 5-GHz band is used in link 1 and a W56 (100, . . . , 140) channel is used in link 2, thereby executing multi-link communication. Note that the number of radio links in the multi-link is not limited to two, and three or more radio links may be used.

In this embodiment, the AP is an STR (Simultaneous Transmit/Receive) MLD (Multi-Link Device), and the STA is a non-STR MLD. Here, "STR" indicates that "reception in link 2 simultaneously with transmission in link 1 in a common time section" or "transmission in link 2 simultaneously with reception in link 1 in a common time section" is possible. On the other hand, "non-STR" indicates that "reception in link 2 simultaneously with transmission in link 1 in a common time section" or "transmission in link 2 simultaneously with reception in link 1 in a common time section" is impossible. That is, the AP can transmit signals in one radio link while receiving signals in the other radio link. On the other hand, even if the STA can receive signals in both the two radio links, the STA cannot simultaneously execute transmission in one radio link and reception in the other radio link.

Note that whether the STR operation is possible may change depending on the state of the device. That is, there are a case in which the STR operation is impossible due to the absolute capability such as physical capability, and a case in which the STR operation is possible depending on the operating radio channel. The AP and the STA can exchange each other's capability information and state information. For example, the capability information and state information can be exchanged using IEs (Information Elements) complying with the IEEE802.11 standard series. Note that since the multi-link function is a function introduced from the IEEE802.11be standard, the capability information for implementing the function can be included in an IE (Information Element) called an EHT Capabilities element. For example, static capability can be indicated by an EHT Capabilities element, and a dynamic capability change can be indicated by an EHT Operation element. In this case, the AP and the STA include these information elements in a Management frame to be used in a connection or reconnection procedure. Note that the Management frame is a Beacon, Probe Request/Response, Association Request/Response, or Authentication Request/Response frame. The AP and the STA can also exchange these pieces of information at an arbitrary timing without limitation to the timing of connection/reconnection by OMI (Operating Mode Indication) introduced from IEEE802.11 ax.

In this embodiment, the AP and the STA adopt EDCA (Enhanced Distributed Channel Access) as the access rule of each radio link.

First Processing Example

FIG. 4 shows an example of the procedure of the first processing example. In this processing, first, STA 1 stands by, without transmitting any signals, during a period 401 until the EDCA backoff counter of link 1 becomes zero. If STA 1 holds, at a timing when the EDCA backoff counter becomes zero, data to be transmitted, STA 1 starts wireless access. Then, STA 1 transmits, to the AP, an RTT (Request To Trigger) frame 402 at a MAC (Medium Access Control) layer level in link 1. This RTT frame includes a TXOP (Transmission Opportunity), and has an effect of updating a NAV (Network Allocation Vector) with respect to a terminal other than the AP. A period 403 represents a period during which STA 1 is the owner of the TXOP. Furthermore, by transmitting the RTT frame, STA 1 makes a notification that synchronous transmission is performed in links 1 and 2 and also requests the AP to perform processing for it. Then, the AP transmits, to STA 1, an ack 404 as a response representing acceptance of the request of the RTT frame.

Subsequently, the AP attempts to acquire a transmission right in link 2. A period 405 indicates a state in which a transmitter that is neither the AP nor STA 1 uses link 2. During this period, the AP cannot acquire the transmission right. Therefore, the AP stands by until link 2 becomes idle (a radio medium becomes idle), and then attempts to acquire the transmission right in link 2. The AP stands by without transmitting any signals during a period 407 until link 2 becomes idle and the EDCA backoff counter of link 2 becomes zero.

Note that the AP stands by without performing communication in link 1 until it becomes possible to acquire the transmission right in link 2. For example, during a gap 406 after the ack 404, the AP prevents communication of STA 1 in link 1. Then, the AP transmits a trigger frame (TF 408) to STA 1 in link 1 at a timing when the transmission right in link 2 can be acquired. The TF 408 includes the duration (time information) of data transmittable by the terminal that has received the TF 408 after the elapse of SIFS (Short InterFrame Space). Note that the TF 408 can have, for example, an IEEE802.11ax format to be described later with reference to FIGS. 12A to 12C. Along (simultaneously) with this, the AP transmits a trigger frame (TF 409) to STA 1 in link 2. In addition to information similar to that of the TF 407, the TF 409 includes information of a TXOP acquired by the AP in link 2. With the TXOP, the AP updates a NAV with respect to a terminal other than STA 1, thereby acquiring the transmission right during a period 410. The length of the period 410 is set so that its termination coincides with that of the period 403.

In response to the TF 408, STA 1 transmits an UL (Uplink) Aggregate Medium access control Protocol Data Unit (A-MPDU 411) to the AP in link 1. Simultaneously with this, STA 1 transmits an A-MPDU 412 to the AP in link 2. STA 1 sets the time lengths of the A-MPDUs 411 and the 412 to be equal to each other. To do this, STA 1 can adjust the time length of the frames, as needed, by using different MCS (Modulation and Coding Scheme) values in links 1 and 2 or adding a padding area to one of the MPDUs.

Upon receiving these UL data, the AP returns a response (BA+TF 413) to STA 1 in link 1. Similar to the transmission of the response in link 1, the AP also returns a response (BA+TF 414) to STA 1 in link 2. This response is obtained by adding the meaning of "TF" to "BA (Block Ack)" to the A-MPDU. Note that at this stage, the AP can terminate UL multi-link communication from STA 1 by transmitting a simple BA added with no meaning of "TF". For example, to terminate UL multi-link communication at the termination of the TXOP periods 403 and 410, the AP can transmit BAs 417 and 418 added with no meaning of "TF" in response to A-MPDUs 415 and 416, respectively.

As described above, the timing when the TFs 408 and 409 are transmitted is adjusted in accordance with the state of link 2, thereby allowing STA 1 to appropriately execute UL communication in the multi-link.

Second Processing Example

Figure 5:
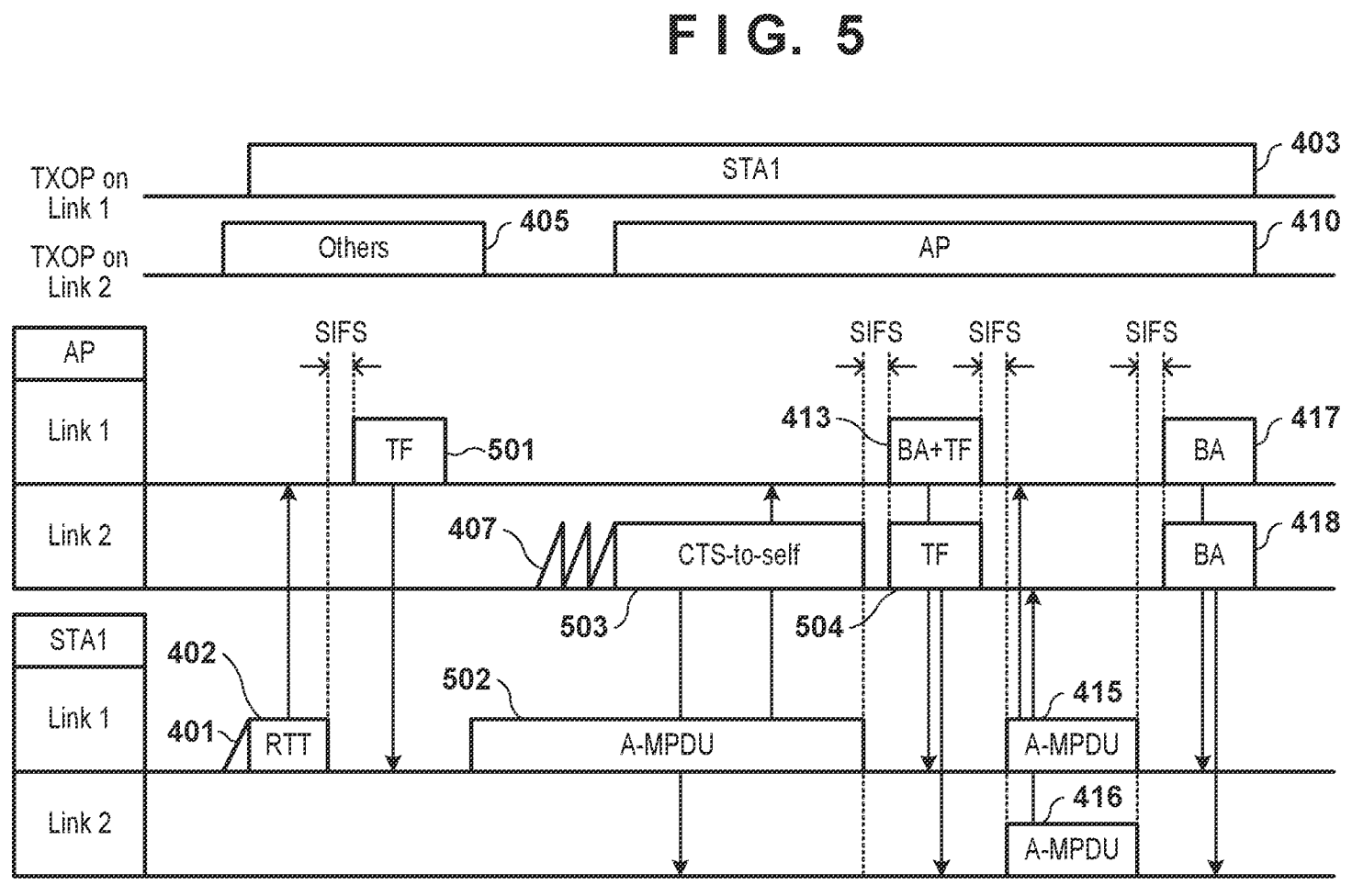

The second processing example will be described with reference to FIG. 5. Note that if the same processing (for example, the same signal transmission/reception processing) as in the first processing example is executed, the same reference numeral is given and a description thereof will be omitted.

In the second processing example, the period of the gap 406 in the first processing example is reduced or deleted. In the first processing example, after the AP acquires the TXOP in link 2, STA 1 executes simultaneous communication in links 1 and 2, and thus the time of the gap 406 is required between the RTT frame 402 and the TF 408. The gap 406 is mainly a time until the AP acquires the TXOP in link 2. To the contrary to this control, in this processing example, if the AP cannot acquire the TXOP in link 2 at the time of receiving the RTT frame 402, the AP transmits only a TF 508 in link 1, and activates, after acquisition of the TXOP in link 2, simultaneous transmission in links 1 and 2. That is, in response to reception of the RTT frame 402 from STA 1 in link 1, the AP transmits a TF 501 to STA 1 in link 1. With this TF 501, UL communication in link 1 is immediately activated. The TF 501 and the TF 408 in the first processing example are different in a method of deciding the duration value of the UL frame to be activated. Then, STA 1 transmits, to the AP in link 1, an A-MPDU 502 of a time length corresponding to the duration value designated by the TF 501. Assume here that link 2 becomes idle while STA 1 transmits the A-MPDU 502. In response to this, the AP starts the backoff count of EDCA access, and transmits, after the elapse of the period 407, a CTS-to-self frame 503 in link 2. With this CTS-to-self frame, the TXOP period 410 in link 2 is designated. The length of the period 410 is set so that its termination coincides with that of the period 403. The frame length of the CTS-to-self frame 503 is set so that its termination coincides with that of the A-MPDU 411. Note that this frame may have a CTS-to-self format defined by the IEEE802.11-2016 standard, and may have, for example, a format added with a padding area. Note that since the AP is an STR MLD, it can transmit the CTS-to-self frame 503 while receiving the A-MPDU 502.

After that, as a response corresponding to completion of reception of the A-MPDU 502 in link 1, the AP transmits the BA+TF 413 having the format of the BA added with the TF. On the other hand, since the AP has received no data in link 2, it transmits a TF 504 without transmitting the BA. With the BA+TF 413 and the TF 504, STA 1 can transmit data simultaneously in links 1 and 2. Subsequent processing is the same as in the first processing example.

In this processing example, since the ack 404 and the gap 406 are omitted in the first processing example, STA 1 can execute communication more in link 1. Note that the duration of the TF 501 can be decided in accordance with the state of link 2. That is, the AP may adjust the period of the A-MPDU 502 in accordance with the termination timing of the period 405 in link 2, the NAV value of its own, the backoff counter value, and the like. For example, the AP can set the length of the period, when it is determined that the access right in link 2 can be acquired immediately, shorter than the length of the period when it is not determined that the access right in link 2 can be acquired immediately. Therefore, a long length of the period of multi-link transmission of the A-MPDUs 415 and 416 can be ensured, thereby improving the communication efficiency.

Note that in the second processing example, upon receiving the RTT frame 402, the AP may return the ack 404 to STA 1, and activate a timer at this time to give a time before transmission of the TF 501. Then, the AP may execute the procedure in the first processing example if it can acquire the transmission right in link 2 before a time-out occurs, and may transmit the TF 501 if a time-out occurs. Therefore, if the AP can acquire the transmission right within a short period, it is possible to prevent a period, during which multi-link communication is not performed, from being prolonged due to transmission of the A-MPDU 502. Note that if a time-out occurs, the AP need not transmit the TF 501. In this case, a similar timer may be activated in STA 1, and communication may be performed only in link 1 when a time-out occurs. Note that if a time is given before transmission of the TF 501, the AP need not transmit the ack 404. That is, the AP may determine whether a time-out of the activated timer occurs without transmitting the ack 404 after receiving the RTT frame 402.

Third Processing Example

The third processing example will be described with reference to FIG. 6. Note that if the same processing (for example, the same signal transmission/reception processing) as in the first processing example is executed, the same reference numeral is given and a description thereof will be omitted. In this processing example, STA 2 is added as a communication partner of the AP, and STA 1 and STA 2 execute communication by sharing frequency resources using OFDMA.

After standing by during the period 401 until the EDCA backoff counter becomes zero, STA 1 transmits a frame (RTT+BSR 601) obtained by adding BSR (Buffer Status Report) information to the meaning of RTT. The BSR can have two kinds of formats including a format newly defined by IEEE802.11ax and a format defined by a standard before IEEE802.11ax. If either of the formats is used, the AP is notified of information of the amount of data, transmission of which is awaited, for each of four access categories in STA 1. The BSR can be a value for each of links 1 and 2. After that, before transmitting the TF 408, the AP calculates the amount of radio resources required by STA 1 in each of links 1 and 2. Note that the AP can calculate the amount of radio resources required in each link based on the period 403 during which STA 1 has the transmission right, the transmission data amount notified by the RTT+BSR 601, the transmission speed of each link, and the use MCS. Assume here that the amount of resources required in link 1 is larger. Then, the AP transmits the same TF 408 as in the first processing example to STA 1 in link 1, and the STA transmits the A-MPDU 411 to the AP in link 1 after the elapse of SIFS since the termination of the TF 408.

Furthermore, the AP determines whether the difference between the amount of resources required in link 1 and that required in link 2 is equal to or larger than a predetermined value. If the AP determines that the difference between the two required amounts of resources is equal to or smaller than the predetermined value, the AP executes the same processing as in the first processing example. On the other hand, if the AP determines that the difference between the two required amounts of resources exceeds the predetermined value, the AP confirms whether there exists an STA, other than STA 1, capable of executing UL or DL (Downlink) communication in link 2 (the link in which the required amount of resources is smaller). Assume here that the AP grasps that STA 2 holds UL data based on, for example, the BSR information received from STA 2 before the period 405. In this case, the AP transmits, to STA 1 and STA 2, a TF 602 of IEEE802.11ax for accelerating UL communication. With this TF 602, RUs (Resource Units) for OFDMA communication are allocated to STA 1 and STA 2. On the other hand, upon receiving the TF 409 in the first processing example, the STA performs not MU (Multi-User) OFDMA communication but SU (Single-User) communication using the entire bandwidth. In link 2, after the elapse of SIFS since the termination of the TF 602, STA 1 transmits OFDMA data 603 to the AP and STA 2 transmits OFDMA data 604 to the AP. In link 1, the AP transmits the BA+TF 413 to STA 1, similar to the first processing example. On the other hand, the AP transmits a BA 605 to STA 2, and transmits a BA+TF 606 to STA 1. The BA 605 and the BA+TF 606 are multiplexed in a frequency domain using OFDMA. Subsequent processing is the same as in the first processing example.

Note that if there is no STA that executes data communication other than STA 1 before transmitting the TF 602, the AP executes the same processing as in the first processing example. That is, the AP can transmit, to STA 1, not the TF 602 of IEEE802.11ax but the TF 409 shown in FIG. 4.

Note that if, for example, data to be communicated by STA 1 are all transmitted by the A-MPDU 411 and the OFDMA data 603, communication after transmission of the A-MPDUs 415 and 416 need not be executed. If, for example, transmission of all the data to be communicated by STA 2 cannot be completed by the OFDMA data 604, transmission of the TFs 408 and 602 from the AP and transmission of the A-MPDU and OFDMA data from the STA may be repeated. Note that in the second and subsequent transmission processes of the TFs 408 and 602, the AP may communicate with STA 3 different from STA 2.

Fourth Processing Example

The fourth processing example will be described with reference to FIG. 7. In this processing example, communication with an STA different from STA 1 is time-divisionally executed. As a time division method, RDP (Reverse Direction Protocol) defined by the IEEE802.11 standard is used. Note that if the same processing (for example, the same signal transmission/reception processing) as in the first or third processing example is executed, the same reference numeral is given and a description thereof will be omitted. In this processing example, similar to the third processing example, the AP stands by until it acquires the transmission right in link 2, and then transmits the TF 408. At this time, the AP transmits an RDP frame 701 to STA 1 simultaneously with the TF 408.

The RDP procedure will now be described. In the RDP, a terminal (AP or STA) that activates the procedure is called an RD initiator. To the contrary, a terminal (AP or STA) that is given the transmission right by the RD initiator is called an RD responder. First, the RD initiator acquires the transmission right (TXOP). Next, the RD initiator transmits a MAC frame to the RD responder. At this time, the bit of an RDG/More PPDU subfield of an HT Control field of the MAC frame is set to "1". When the subfield is set to "1", this indicates that transmission in the opposite direction is ensured, as indicated by the name (Reverse Direction Grant) of the RDG That is, this allows transmission from the RD responder to the RD initiator. Note that the TXOP acquired by the RD initiator is indicated in the Duration/ID field of the MAC frame from the RD initiator. Therefore, the RD responder can use the TXOP for transmission of the self-apparatus. At this time, when the bit of the RDG/More PPDU subfield of the MAC frame is set to "0", this indicates the end of transmission to the RD initiator. Upon receiving the MAC frame in which the bit of the RDG/More PPDU subfield is set to "0", the RD initiator can give the remaining TXOP to another RD responder.

In the example shown in FIG. 7, the AP serves as the RD initiator to transmit the RDP frame 701, thereby giving the transmission right to STA 1. The length of the RDP frame at this time is adjusted to be equal to the length of the TF 408. A value representing the length of the period 410 is set in the Duration field of the RDP frame. STA 1 transmits the A-MPDU 411 in link 1 while transmitting a Response burst 702 in link 2. The first data of the Response burst is a BA (Block Ack), to the RDP frame 701, in which the bit of the RDG/More PPDU subfield is set to "1". Then, a PPDU in which the bit of the RDG/More PPDU subfield is set to "0" follows. Note that STA 1 transmits the A-MPDU 411 and the Response burst 702 by setting their lengths equal to each other, and waits for responses from the AP in links 1 and 2 after the elapse of SIFS. Then, the AP transmits the BA+TF 413 to STA 1 in link 1. On the other hand, the AP transmits a BA 703 to STA 1 in link 2. Subsequently, the AP transmits an RDP frame 704 to STA 2. Note that the AP performs adjustment so that the termination of the BA+TF 413 coincides with that of the RDP frame 704. In response to the BA+TF 413, STA 1 transmits the A-MPDU 415 to the AP in link 1. On the other hand, since STA 1 receives neither the TF nor the RDP frame in link 2, it transmits neither the A-MPDU nor the Response burst. In response to the RDP frame 704, STA 2 transmits a Response burst 705 in link 2. Then, the AP transmits, to STA 1 in link 1, the BA 417 to the A-MPDU 415, and transmits, to STA 2 in link 2, the BA 418 to the Response burst 705.

As described above, in this processing example, STA 1 and STA 2 time-divisionally use link 2. Note that the Response burst 702 and the Response burst 705 are SU frames that use the entire bandwidth of the use channel.

Note that in each of the above-described processing examples, a condition under which the STA transmits the RTT frame may be set, and the STA may operate under the condition. For example, the STA can be configured to transmit the RTT frame if the first condition that there are data in the transmission buffers of a plurality of links when the backoff counter becomes zero in a given link is satisfied. If, in addition to the first condition, the second condition that the link for which the backoff counter is zero is a link for which a transmission buffer amount is larger is satisfied, the STA may transmit the RTT frame. That is, the STA can be configured not to transmit the RTT frame and the data if the backoff counter of the link for which the transmission buffer amount is smaller is zero. If, in addition to the first condition (and the second condition, as needed), the third condition that the difference in transmission buffer amount between arbitrary two or more links is equal to or smaller than a predetermined value is satisfied, the STA may transmit the RTT frame. In each of the above-described processing examples, if there is no period 405 during which another apparatus acquires the transmission right, the AP can accordingly acquire the transmission right earlier.

Subsequently, an example of the procedure of processing executed by the STA will be described with reference to FIGS. 8A and 8B. This processing can be implemented when the control unit 202 of the STA executes the programs stored in the storage unit 201. Note that the STA may include dedicated hardware for implementing at least one of processing steps to be described below. Note also that the processing shown in FIGS. 8A and 8B is performed after connection to the AP is established.

In this processing, the STA confirms whether it is in a state in which a multi-link operation is executed (step S801). This state is set by, for example, the user of the STA to input via the input unit 204 of the STA. If the STA is not in the state in which a multi-link operation is executed (NO in step S801), the STA executes single-link communication processing using the first communication unit 206 and the second communication unit 208 individually (step S802). The single-link communication processing is executed similar to the conventional communication processing, and a description thereof will be omitted. After that, the STA returns the process to step S801. On the other hand, if the STA is in the state in which a multi-link operation is executed (YES in step S801), the STA confirms whether transmission data in a plurality of links among links constituting a multi-link exist in transmission buffers (step S803). If no transmission data in the plurality of links exist in the transmission buffers (NO in step S803), the STA stands by in this state. On the other hand, if the transmission data in the plurality of links exist in the transmission buffers (YES in step S803), the STA determines whether a transmission right in a link in which an RTT frame is transmitted can be acquired (step S804). If the radio medium of the target link is idle and the EDCA backoff counter is zero, the transmission right in the link is acquired. If the STA cannot acquire the transmission right in the link in which an RTT frame is transmitted (NO in step S804), an attempt to acquire the transmission right is repeatedly made. On the other hand, if the STA can acquire the transmission right in the link in which an RTT frame is transmitted (YES in step S804), the STA forms an RTT frame (step S805). This frame includes, as components, a TXOP and a BSR (Buffer Status Report) for each link of the multi-link. Then, the STA transmits the formed RTT frame (step S806).

After that, the STA starts a timer for waiting for a response (TF) to the RTT frame from the AP (step S807). Then, the STA confirms whether the TFs have been received in all the links constituting the multi-link (step S808). If the TFs been received in all the links (YES in step S808), the STA transmits data (A-MPDU, OFDMA data, and Response burst) in each link (step S809). Then, the STA receives a response (BA or BA+TF) in each link (step S810). After that, the STA determines whether to terminate multi-link communication (step S811). If, for example, the response in step S810 includes the TF, the STA determines not to terminate multi-link communication; otherwise, the STA determines to terminate multi-link communication. If the STA determines to terminate multi-link communication (YES in step S811), the STA returns the process to step S801; otherwise (NO in step S811), the STA returns the process to step S809 and repeatedly executes multi-link communication. If the TFs have been received in not all the links (NO in step S808), the STA determines whether a time-out has occurred (step S812). While no time-out occurs (NO in step S812), the STA continuously waits for the TF in step S808. On the other hand, if a time-out occurs (YES in step S812), the STA communicates with the AP by single-link communication without executing multi-link communication (step S802).

Subsequently, an example of the procedure of processing executed by the AP will be described with reference to FIGS. 9A and 9B. This processing can be implemented when the control unit 202 of the AP executes the programs stored in the storage unit 201. Note that the AP may include dedicated hardware for implementing at least one of processing steps to be described below. Note also that the processing shown in FIGS. 9A and 9B is performed after connection to the STA is established.

First, the AP confirms whether an RTT frame has been received from the STA (step S901). While no RTT frame is received from the STA (NO in step S901), the AP determines whether there is transmission/reception data other than the RTT frame (step S918). If there is such transmission/ reception data (YES in step S918), the AP executes trans- mission/reception processing of the transmission/reception data (step S919). Note that the transmission/reception pro- cessing is conventional processing unlike the processing for the multi-link communication request from the STA, and a description thereof will be omitted. Note that if there is no transmission/reception data (NO in step S918), the AP returns the process to step S901.

If the RTT frame has been received from the STA (YES in step S901), the AP confirms contents of the TXOP and BSR included in the RTT frame, and calculates the amount of resources required in each link of the multi-link (step S902). The amount of resources can be the communication speed, use MCS, and radio bandwidth for transmitting data indicated by the BSR during the TXOP period. Then, the AP determines whether another STA different from STA 1 that has transmitted the RTT frame is to be included as a communication target (step S903). This determination pro- cessing can be based on the calculation result of the amount of required resources in step S902. If, for example, the difference between the amounts of resources required in the respective links exceeds a predetermined value, the AP can determine that another STA is to be included as a commu- nication partner. If the AP determines that another STA is to be included as a communication partner (YES in step S903), the AP selects and decides another STA to be included as a communication partner (step S904). In this processing, for example, among STAs other than STA 1 that has transmitted the RTT frame, an STA that holds transmission data is selected. Whether each STA holds transmission data can be determined by confirming BSR information from the STA. Assume that the AP has received the BSR information from each STA belonging to the BSS 103. The STA selected in step S904 will be referred to as STA 2 hereinafter. Note that in step S904, if there is no appropriate STA, the AP holds information indicating that there is no appropriate STA and regards STA 1 as STA 2. Note that if the AP determines that another STA is not to be included as a communication partner (NO in step S903), the AP skips the processing in step S904.

Then, the AP transmits a TF in the link in which the RTT frame has been received (step S905). On the other hand, the AP decides whether to use the RDP as a communication method of STA 1 and STA 2 in the link in which no RTT frame has been received (step S906).

If the AP decides to use the RDP (YES in step S906), the AP transmits an RDP frame in the link in which no RTT frame has been received (step S907). The AP can adjust the frame length so that the termination of the TF in step S905 coincides with that of the RDP frame in step S907. Then, the AP receives data from STA 1 in the link in which the RTT frame has been received (step S908), and receives data from the STA to which the transmission right is given by the RDP frame (step S909). The AP returns a response (BA or BA+TF) to STA 1 in the link in which the RTT frame has been received (step S910). Furthermore, the AP returns a response (BA) to the STA to which the transmission right is given by the RDP frame in the other link, and transmits RDP frame to the STA (for example, STA 2) to which the transmission right is to be given next (step S911). Note that the AP can adjust the frame length so that the termination of the response in step S910 coincides that of the response and the RDP frame in step S911.

If the AP decides not to use the RDP (NO in step S906), the AP transmits a TF or an OFDMA TF in the link in which no RTT frame has been received (step S913). At this time, if it is determined not to include another STA as a commu- nication target or if STA 1 and STA 2 are regarded as the same STA, the AP can transmit a TA, and if STA 1 and STA 2 are different from each other, the AP can transmit an OFDMA TF. Note that the AP can adjust the frame length so that the termination of the TF in step S905 coincides with that of the TF in step S913. Then, the AP receives data in the link in which the RTT frame has been received (step S914), and receives SU or OFDMA data in the other link (step S915). The AP returns a response to STA 1 in the link in which the RTT frame has been received (step S916). The AP returns an SU or Multi-STA response in the other link (step S917). If it is determined not to include another STA as a communication target or if STA 1 and STA 2 are regarded as the same STA, the AP can transmit an SU response, and if STA 1 and STA 2 are different from each other, the AP can transmit a Multi-STA response. Note that the Multi-STA response can be an OFDMA BA or a Multi-STA BA of IEEE802.11ax.

After that, the AP determines whether to end multi-link communication by the RTT frame in step S901 (step S912). If it is determined to terminate multi-link communication (YES in step S912), the AP returns the process to step S901; otherwise (NO in step S912), the AP returns the process to step S905. Note that if the RTT frame includes no BSR information in step S902 described above, subsequent con- trol is executed using only the TXOP. At this time, the result of the determination processing in step S903 is "NO".

(Frame Structure)

The structure of a MAC (Medium Access Control) frame 1000 complying with the IEEE802.11 standard and IEs (Information Elements) as elements of a Frame Body field 1010 will be described with reference to FIGS. 10A to 10C. FIG. 10A shows an example of the overall structure of the MAC frame 1000. In the MAC frame 1000, a Frame Control field 1001 is a field concerning control of the overall frame and has a length of 2 octets (16 bits). More specifically, the Frame Control field 1001 includes subfields to be described later with reference to FIG. 10B. A Duration/ID field 1002 has a length of 2 octets, and indicates, when an MSB (Most Significant Bits: B15) is "1", a frame length or a time such as a TXOP period by the remaining 15 bits within the range from 0 to 32,767 msec. An Address field 1003 is a field having a length of 6 octets, and an address such as a BSSID, a transmission source, or a destination is set depending on the type (a Type subfield 1022) of the MAC frame. Address fields 1004, 1005, and 1007 are similar fields, but are set, as necessary, in accordance with the number of addresses to be indicated. A Sequence Control field 1006 is a field set with a length of 2 octets, as needed, to store information such as the sequence number of data or the like.

A QoS Control field 1008 is a field set with a length of 2 octets, as needed, to store information such as a BSR (Buffer Status Report) complying with a standard before IEEE802.11ax. If a BSR complying with a standard before IEEE802.11ax is stored, the BSR is represented by two pieces of information. Among the two pieces of information, the first information is a 4-bit TID (Traffic Identifier). In the case of the EDCA access method, a value of 0 to 7 among values indicated by the TID indicates one of four access categories of AC_VO (voice)/AC_VI (video)/AC_BE (best effort)/AC_BK (background). The second information is an 8-bit Queue size. The Queue size is expressed in a unit of 256 octets, and indicates a data amount remaining in the transmission buffer.

An HT Control field 1009 is a field set with a length of 4 octets, as needed. In the IEEE802.11ax standard, if the first bit is set to "0", this indicates that this frame is an HT (Hight Throughput: IEEE802.11n) frame. If the first two bits are set to 10, this indicates that this frame is a VHT (Very High Throughput: IEEE802.11ac) frame. If the first two bits are set to 11, this indicates that this frame is an HE (High Efficiency: IEEE802.11ax) frame. Note that with respect to an EHT (Extremely High Throughput: IEEE802.11be) frame, it is not decided whether such definition is made.

The Frame Body field 1010 is a field in which data to be transmitted is stored, and has a length variable depending on the data length. Note that IEs shown in FIG. 10C can be stored as part of the Frame Body field 1010. An FCS field 1011 is a frame check sequence in which a bit for error detection is stored.

Subsequently, contents of the Frame Control field 1001 will generally be described with reference to FIG. 10B. A Protocol Version subfield 1021 is a 2-bit subfield indicating the protocol version, and is set to 0 for an IEEE802.11 frame. A Type subfield 1022 is a 2-bit subfield indicating the type of the frame, and indicates any of the Management, Control, and Data frames. A Subtype subfield 1023 is a 4-bit subfield in which information for more finely classifying the Management, Control, or Data frame type is stored. A To DS subfield 1024 is a 1-bit subfield indicating whether the destination of the frame is a DS (Distribution System). A From DS subfield 1025 is a 1-bit subfield indicating whether the transmission source of the frame is the DS. A More Fragment subfield 1026 is a 1-bit subfield indicating whether the frame is part of a fragment. A Retry subfield 1027 is a 1-bit subfield indicating whether data transmitted before is retransmitted. A Power Management subfield 1028 is a 1-bit subfield indicating whether the STA is in a power-saving mode. A More Data subfield 1029 is a 1-bit subfield indicating whether there exists further transmission data after the data transmitted by the current frame. A Protected Frame subfield 1030 is a 1-bit subfield indicating whether the frame is protected by encryption. A+HTC subfield 1031 is a 1-bit subfield indicating whether, for example, the HT Control field 1009 is included.

The structure of an IE included in the Frame Body field 1010 will generally be described next with reference to FIG. 10C. FIG. 10C particularly shows the structure of the EHT Capabilities element. An Element ID subfield 1041 stores the identifier of the IE. A value concerning the EHT of IEEE802.11be follows the value of the HE Capabilities element of IEEE802.11ax and is set to, for example, 255. A Length subfield 1042 indicates the length of the information element. In an Element ID Extension subfield 1043, the identifier of the IE set as needed is stored. For example, in this embodiment, values corresponding to an EHT Capabilities element concerning capability information and an EHT Operation element concerning operation information are newly defined. These values are stored in the Element ID Extension subfield 1043.

An EHT MAC Capabilities Information subfield 1044 stores information concerning the capability of the MAC layer. An EHT PHY Capabilities Information subfield 1045 stores information concerning the capability of the physical layer (PHY). A Supported EHT-MCS And NSS Set subfield 1046 stores a value representing a supported modulation and coding scheme (MCS) and the number of spatial streams (NSS). A PPE (Physical layer Packet Extension) Thresholds subfield 1047 stores optional information.

In one example of this embodiment, a field representing multi-link capability is defined in the EHT MAC Capabilities Information subfield 1044, and this field is used to exchange capability between the AP and the STA.

The structure of the HT Control field 1009 will generally be described with reference to FIG. 11. The HT Control field 1009 has a length of 4 octets=32 bits. A Variant 1101 indicates the type of information. The type of information is decided by two bits (a bit 1102 and a bit 1103). This embodiment assumes that HE (High Efficiency: IEEE802.11ax) and EHT (Extremely High Throughput: IEEE802.11be) correspond to the same bit string "11". If the type is HE or EHT, an A-Control field 1104 is a field having a length of 30 bits. The A-Control field 1104 includes a Control List subfield 1105 and a Padding subfield 1106. A Control ID subfield 1107 represents the type of the Control List subfield 1105, and a Control Information subfield 1108 represents contents corresponding to the type. For example, "3" as a BSR newly defined by IEEE802.11ax is stored in the Control ID subfield 1107, and 26-bit information is stored in the Control Information subfield 1108. The 26-bit information includes the following information.

- 4 bits: ACI Bitmap (an access category for which information is included)
- 2 bits: Delta TID (the above combination pattern)
- 2 bits: ACI High (an access category indicated by Queue Size High)
- 2 bits: Scaling Factor (the unit of the Queue size: 16/256/ 2048/32768)
- 8 bits: Queue Size High
- 8 bits: Queue Size All (the buffer amount for all the four access categories)

As described above, this BSR can indicate more detailed information, as compared with the BSR using the QoS Control field 1008. Note that the RTT frame indicates the buffer amount for each radio link using the format of IEEE802.11ax.

The structure of a trigger frame (TF 1200) will generally be described with reference to FIGS. 12A to 12C. The TF is a frame introduced from IEEE802.11ax, and is a frame indicating an activation timing, radio channel information using the frame, and the like, which are needed for a plurality of terminals (users) to simultaneously transmit frames to an AP.

A Frame Control field 1201 is a field common to the IEEE802.11 standard series, and stores, for example, a value representing that the frame is a trigger frame of IEEE802.11ax. This field has a length of 2 octets. A Duration field 1202 is a field indicating the time length of this frame, and has a length of 2 octets. An RA field 1203 is a field indicating a receiver address, and has a length of 6 octets. A TA field 1204 is a field indicating a transmitter address, and has a length of 6 octets. A Common Info field 1205 is a field indicating information common to a plurality of terminals that are the destinations of the TF, and has a length of 8 octets or more. The Common Info field 1205 will be described in detail later. A Per User Info field 1206 is a field indicating individual information for each of the destinations of the TF, and an individual field is prepared for each destination. Each Per User Info field 1206 has a length of 5 octets or more. A Padding field 1207 is a field used to give a time to the terminal group that has received the TF. The AP decides the time based on MinTrigProcTime of each STA. In general, a padding corresponding to the maximum value of MinTrigProcTime of the STAs as the destinations of the TF is used. An FCS field 1208 is a frame check sequence in which a bit for error detection is stored.

As shown in FIG. 12B, the Common Info field 1205 includes a Trigger Type subfield 1211, a Length subfield 1212, and a Trigger Type dependent subfield 1213. The Trigger Type subfield 1211 is a 4-bit subfield, details of which are as shown in FIG. 12C. In this embodiment, as one example, a TF for a multi-link is newly defined, and is associated with a value "8" of the Trigger Type subfield 1211. Thus, the STA that has received the TF 1200 in which the value of the Trigger Type subfield 1211 is "8" can recognize that this TF is a TF for a multi-link. The Length subfield 1212 stores a length corresponding to the type designated by the Trigger Type subfield 1211. The Trigger Type dependent subfield 1213 gives an explanation corresponding to the type designated by the Trigger Type subfield 1211.

As described above, the AP can cause the STA to execute multi-link communication based on the RTT frame from the STA, thereby implementing fast and efficient wireless communication. Note that if, for example, the difference between the amounts of radio resources required in the respective links of the multi-link exceeds a predetermined value, excessive radio resources expected in one link can be allocated to another STA. This can improve the efficiency of communication at the time of multi-link communication. Note that in this embodiment, for example, in the link that requires a more amount of resources, the time length of the A-MPDU is set by assuming that all usable frequency resources are used. Then, the A-MPDU or OFDMA data whose time length is set to be equal to that time length can be transmitted in the other link. However, the present invention is not limited to this. If the amounts of resources required in both the links are not large, OFDMA data may be used in both the links. If, for example, all the data can be transmitted in a frame of a shortest time length, the excessive resources may be allocated to communication of another STA. That is, the radio resources may be allocated to another STA in both links 1 and 2.

Note that the above-described AP may operate as, for example, the above-described STA in communication with another AP. The above-described STA may operate as, for example, the above-described AP in communication with another STA. Each of the above-described processes has been explained by exemplifying the AP and STA complying with the IEEE802.11be standard. However, the above-described procedure may be executed in accordance with the standard replacing the IEEE802.11be standard or another wireless communication standard irrelevant to the wireless LAN. The technical terms in the above description are exemplarily used, and are not intended to limit the present invention to the specific embodiments. For example, the RTT frame is a frame used by the STA to request data transmission but the above-described processing may be performed based on another predetermined frame. That is, when the first apparatus transmits a predetermined frame, radio resources can be allocated to not only the first apparatus but also the second apparatus.

According to the present invention, it is possible to implement efficient wireless communication in a wireless communication system capable of constituting a multi-link.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operating as an access point compliant with an IEEE 802.11 standard, comprising: one or more processors; and one or more memories that store a computer-readable instruction for causing, when executed by the one or more processors, the one or more processors to function as: a communication unit configured to establish at least a first link using a first frequency channel and a second link using a second frequency channel with one or more other apparatuses operating as a station compliant with the IEEE 802.11 standard, and performing wireless communication; and a control unit configured to control, based on reception on the first frequency channel, from a first other apparatus operating as a station compliant with the IEEE 802.11 standard, of a predetermined frame for requesting transmission of a trigger frame for executing communication by simultaneously using the first frequency channel and the second frequency channel, the communication unit to transmit on the first frequency channel, to the first other apparatus, a first trigger frame including information indicating allocation of radio resources of the first frequency channel to the first other apparatus but not to a second other apparatus different from the first other apparatus that operates as a station compliant with the IEEE 802.11 standard and does not transmit the predetermined frame, and to transmit, to the first other apparatus and the second other apparatus, a second trigger frame including information indicating allocation of the radio resources and the second frequency channel to the first other apparatus and the second other apparatus.

2. The communication apparatus according to claim 1, wherein the predetermined frame includes information indicating an amount of data to be transmitted by the first other apparatus on the first frequency channel and the second frequency channel.

3. The communication apparatus according to claim 2, wherein the control unit specifies an amount of required radio resources of the first frequency channel and the second frequency channel based on the amount of data to be transmitted by the first other apparatus on the first frequency channel and the second frequency channel and allocates the radio resources to the first other apparatus based on the amounts of radio resources.

4. The communication apparatus according to claim 1, wherein the predetermined frame is received on the first frequency channel for which the first other apparatus acquires a transmission right, and includes information concerning a period during which the first other apparatus acquires the transmission right on the first frequency channel.

5. The communication apparatus according to claim 1, wherein the control unit allocates, in a time-divisional manner, the radio resources to the first other apparatus and the second other apparatus on the second frequency channel.

6. The communication apparatus according to claim 1, wherein the control unit allocates, in a frequency divisional manner, the radio resources to the first other apparatus and the second other apparatus on the second frequency channel.

7. The communication apparatus according to claim 1, wherein in a case where a difference in the amount of radio resources to be allocated to the first other apparatus between the first frequency channel and the second frequency channel exceeds a predetermined value, the control unit allocates the radio resources to the second other apparatus.

8. The communication apparatus according to claim 1, wherein the communication apparatus comprises an access point configured to execute communication complying with an IEEE802.11be standard.

9. A communication apparatus operating as a station compliant with an IEEE 802.11 standard, comprising: one or more processors; and one or more memories that store a computer-readable instruction for causing, when executed by the one or more processors, the one or more processors to function as: a communication unit configured to establish at least a first link using a first frequency channel and a second link using a second frequency channel with a first other apparatus operating as an access point compliant with the IEEE 802.11 standard, and performing wireless communication; and a control unit configured to control the communication unit to:

transmit on the first frequency channel, to the first other apparatus, a predetermined frame for requesting transmission of a trigger frame for executing communication by simultaneously using the first frequency channel and the second frequency channel;

from the first other apparatus and based on the predetermined frame, receive on the first frequency channel a first trigger frame including information indicating allocation of radio resources of the first frequency channel to the communication apparatus but not to a second other apparatus different from the communication apparatus that does not transmit the predetermined frame to the first other apparatus and operates as a station compliant with the IEEE 802.11 standard, and receive on the second frequency channel a second trigger frame including information indicating allocation of radio resources of the second frequency channel to the communication apparatus and the second apparatus; and transmit data to the first other apparatus using the radio resources allocated to the communication apparatus of each of the first frequency channel and the second frequency channel.

10. The communication apparatus according to claim 9, wherein the predetermined frame includes information indicating an amount of data to be transmitted by the communication apparatus on the first frequency channel and the second frequency.

11. The communication apparatus according to claim 9, wherein in a case where the amount of data to be transmitted by the communication apparatus on one of the first frequency channel and the second frequency channel is zero, the control unit controls the communication unit not to transmit the predetermined frame to the first other apparatus.

12. The communication apparatus according to claim 9, wherein the predetermined frame is transmitted on the first frequency channel for which the communication apparatus acquires a transmission right, and includes information concerning a period during which the communication apparatus acquires the transmission right on the first frequency channel.

13. The communication apparatus according to claim 9, wherein the radio resources are allocated, in a time divisional manner, to the communication apparatus and the second other apparatus on the second frequency channel.

14. The communication apparatus according to claim 9, wherein the radio resources are allocated, in a frequency divisional manner, to the communication apparatus and the second other apparatus on the second frequency channel.

15. The communication apparatus according to claim 9, wherein the communication apparatus comprises a station configured to execute communication complying with an IEEE802.11be standard.

16. A communication control method executed by a communication apparatus operating as an access point compliant with an IEEE 802.11 standard and configured to establish at least a first link using a first frequency channel and a second link using a second frequency channel with one or more other apparatuses operating as a station compliant with the IEEE 802.11 standard, and performing wireless communication, comprising:

based on reception on the first frequency channel, from a first other apparatus operating as a station compliant with the IEEE 802.11 standard, of a predetermined frame for requesting transmission of a trigger frame for executing communication by simultaneously using the first frequency channel and the second frequency channel, transmitting on the first frequency channel, to the first other apparatus, a first trigger frame including information indicating allocation of radio resources of the first frequency channel to the first other apparatus but not to a second other apparatus different from the first other apparatus that operates as a station compliant with the IEEE 802.11 standard and does not transmit the predetermined frame, and transmitting, to the first other apparatus and the second other apparatus, a second trigger frame including information indicating allocation of the radio resources the second frequency channel to the first other apparatus and the second other apparatus.

17. A communication method executed by a communication apparatus operating as a station compliant with an IEEE 802.11 standard and configured to establish at least a first link using a first frequency channel and a second link using a second frequency channel with a first other apparatus operating as an access point compliant with the IEEE 802.11 standard, and performing wireless communication, the method comprising:

transmitting on the first frequency channel, to the first other apparatus, a predetermined frame for requesting transmission of a trigger frame for executing communication by simultaneously using the first frequency channel and the second frequency channel;

from the first other apparatus and based on the predetermined frame, receiving on the first frequency channel a first trigger frame including information indicating allocation of radio resources of the first frequency channel to the communication apparatus but not to a second other apparatus different from the communication apparatus that does not transmit the predetermined frame to the first other apparatus and operates as a station compliant with the IEEE 802.11 standard;

receiving on the second frequency channel a second trigger frame including information indicating allocation of radio resources of the second frequency channel to the communication apparatus and the second other apparatus; and transmitting data to the first other apparatus using the radio resources allocated to the communication apparatus of each of the first frequency channel and the second frequency channel.

18. A non-transitory computer-readable storage medium that stores a program for causing a communication apparatus operating as an access point compliant with an IEEE 802.11 standard and configured to establish at least a first link using a first frequency channel and a second link using a second frequency channel with one or more other apparatuses operating as a station compliant with the IEEE 802.11 standard, and performing wireless communication to:

based on reception on the first frequency channel, from a first other apparatus operating as a station compliant with the IEEE 802.11 standard, of a predetermined frame for requesting transmission of a trigger frame for executing communication by simultaneously using the first frequency channel and the second frequency channel, transmit on the first frequency channel, to the first other apparatus, a first trigger frame including information indicating allocation of radio resources of the first frequency channel to the first other apparatus but not to a second other apparatus different from the first other apparatus that operates as a station compliant with the IEEE 802.11 standard and does not transmit the predetermined frame, and transmit, to the first other apparatus and the second other apparatus a second trigger frame including information indicating allocation of the radio resources of and the second frequency channel to the first other apparatus and the second other apparatus.

19. A non-transitory computer-readable storage medium that stores a program for causing a communication apparatus operating as a station compliant with an IEEE 802.11 standard and configured to establish at least a first link using a first frequency channel and a second link using a second frequency channel with a first other apparatus operating as an access point compliant with the IEEE 802.11 standard, and performing wireless communication to:

transmit on the first frequency channel, to the first other apparatus, a predetermined frame for requesting transmission of a trigger frame for executing communication by simultaneously using the first frequency channel and the second frequency channel;

from the first other apparatus and based on the predetermined frame, receive on the first frequency channel a first trigger frame including, information indicating, allocation of radio resources of the first frequency channel and the second frequency channel to the communication apparatus but not to a second other apparatus different from the communication apparatus that does not transmit the predetermined frame to the first other apparatus and operates as a station compliant with the IEEE 802.11 standard;

receive on the second frequency channel a second trigger frame including information indicating allocation of radio resources of the second frequency channel to the communication apparatus and the second other apparatus; and transmit data to the first other apparatus using the radio resources allocated to the communication apparatus of each of the first frequency channel and the second frequency channel.

* * * * *